(12) United States Patent
Suzuki et al.

(10) Patent No.: US 11,548,321 B2
(45) Date of Patent: Jan. 10, 2023

(54) PNEUMATIC TIRE

(71) Applicant: The Yokohama Rubber Co., LTD., Tokyo (JP)

(72) Inventors: Takayuki Suzuki, Hiratsuka (JP); Takafumi Gohara, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 667 days.

(21) Appl. No.: 16/477,179

(22) PCT Filed: Oct. 3, 2017

(86) PCT No.: PCT/JP2017/035903
§ 371 (c)(1),
(2) Date: Jul. 10, 2019

(87) PCT Pub. No.: WO2018/131229
PCT Pub. Date: Jul. 19, 2018

(65) Prior Publication Data
US 2019/0366775 A1 Dec. 5, 2019

(30) Foreign Application Priority Data
Jan. 11, 2017 (JP) .............................. JP2017-002692

(51) Int. Cl.
B60C 11/03 (2006.01)
B60C 11/13 (2006.01)
B60C 11/11 (2006.01)

(52) U.S. Cl.
CPC ........... *B60C 11/0309* (2013.01); *B60C 11/11* (2013.01); *B60C 11/13* (2013.01);
(Continued)

(58) Field of Classification Search
CPC ..... B60C 11/03; B60C 11/0309; B60C 11/11; B60C 11/13; B60C 2011/036;
(Continued)

(56) References Cited

U.S. PATENT DOCUMENTS 4,690,189 A 9/1987 Bradisse et al.
5,658,404 A 8/1997 Brown et al.
(Continued)

FOREIGN PATENT DOCUMENTS

JP S62-181904 8/1987
JP H02-225108 9/1990
(Continued)

OTHER PUBLICATIONS

Machine translation of JP06-227211 (no date).*
International Search Report for International Application No. PCT/JP2017/035903 dated Jan. 9, 2018, 4 pages, Japan.

*Primary Examiner* — Katelyn W Smith
*Assistant Examiner* — Philip N Schwartz
(74) *Attorney, Agent, or Firm* — Thorpe North & Western

(57) ABSTRACT

A pneumatic tire includes a pair of circumferential main grooves, a plurality of center lug grooves, and center blocks. The pair of circumferential main grooves are disposed on both sides of a tire equatorial plane in a tire lateral direction. The tire equatorial plane is interposed between the pair of circumferential main grooves. The pair of circumferential main grooves extend in a tire circumferential direction and oscillate in the tire lateral direction. The plurality of center lug grooves have both ends connected to the pair of circumferential main grooves. The center blocks are defined by the center lug grooves and the pair of circumferential main grooves. The center lug grooves have bent portions at two or more positions. The center blocks include center narrow grooves having both ends connected to the pair of circum- (Continued)

ferential main grooves. The center narrow groove has bent portions at two or more positions.

14 Claims, 14 Drawing Sheets

(52) U.S. Cl.
CPC ............... *B60C 2011/036* (2013.01); *B60C 2011/0346* (2013.01); *B60C 2011/0348* (2013.01); *B60C 2011/0369* (2013.01); *B60C 2200/06* (2013.01)

(58) Field of Classification Search
CPC ..... B60C 2011/0346; B60C 2011/0348; B60C 2011/0369
See application file for complete search history.

(56) References Cited

U.S. PATENT DOCUMENTS

| | | | | |
|---|---|---|---|---|
| D541,731 S | * | 5/2007 | Maziarka | D12/601 |
| D669,423 S | * | 10/2012 | Fujioka | D12/594 |
| 2011/0220261 A1 | | 9/2011 | Matsuzawa | |
| 2011/0259494 A1 | | 10/2011 | Shibano | |
| 2013/0180638 A1 | * | 7/2013 | Washizuka | B60C 11/0311 152/209.8 |
| 2015/0343848 A1 | * | 12/2015 | Washizuka | B60C 11/12 152/209.18 |
| 2016/0221397 A1 | * | 8/2016 | Maehara | B60C 11/0309 |
| 2017/0239997 A1 | * | 8/2017 | Nishino | B60C 11/1369 |
| 2018/0272808 A1 | | 9/2018 | Nishino | |

FOREIGN PATENT DOCUMENTS

| | | | | |
|---|---|---|---|---|
| JP | H03-128705 | | 5/1991 | |
| JP | H03-136911 | | 6/1991 | |
| JP | H04-349004 | | 12/1992 | |
| JP | H05-178031 | | 7/1993 | |
| JP | H05-178032 | | 7/1993 | |
| JP | H05-330319 | | 12/1993 | |
| JP | H06-171319 | | 6/1994 | |
| JP | 06227211 A | * | 8/1994 | ............. B60C 11/00 |
| JP | H06-227211 | | 8/1994 | |
| JP | H07-276922 | | 10/1995 | |
| JP | H07-290908 | | 11/1995 | |
| JP | 2563562 B2 | * | 12/1996 | ......... B60C 11/0318 |
| JP | 2006-044469 | | 2/2006 | |
| JP | 4149219 | | 9/2008 | |
| JP | 2013-147141 | | 8/2013 | |
| JP | 5425802 | | 2/2014 | |
| JP | 2015-223967 | | 12/2015 | |
| JP | 2016-132441 | | 7/2016 | |
| WO | WO 2010/055659 | | 5/2010 | |
| WO | WO 2013/014897 | | 1/2013 | |
| WO | WO-2016024443 A1 | * | 2/2016 | ............. B60C 11/03 |
| WO | WO 2016/117695 | | 7/2016 | |

* cited by examiner

| | CONVENTIONAL EXAMPLE | COMPARATIVE EXAMPLE 1 | COMPARATIVE EXAMPLE 2 | EXAMPLE 1 | EXAMPLE 2 | EXAMPLE 3 |
|---|---|---|---|---|---|---|
| POSITION OF END PORTION OF CENTER NARROW GROOVE | - | TERMINATED IN BLOCK | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE |
| NUMBER OF ROWS OF CENTER BLOCK | 1 | 1 | 2 | 1 | 1 | 1 |
| NUMBER OF BENT PORTIONS IN CENTER LUG GROOVE | 2 | 2 | 2 | 2 | 2 | 2 |
| NUMBER OF BENT PORTIONS IN CENTER NARROW GROOVE | - | 2 | 2 | 2 | 2 | 2 |
| BW/TW | 0.3 | 0.4 | 0.2 | 0.1 | 0.6 | 0.2 |
| RL/BL | - | 0.1 | 0.08 | 0.08 | 0.08 | 0.08 |
| ANGLE α OF BENT PORTION IN CENTER LUG GROOVE | 100 | 90 | 110 | 100 | 100 | 100 |
| ANGLE β OF BENT PORTION IN CENTER NARROW GROOVE | - | 120 | 120 | 100 | 100 | 100 |
| Dc/Dr | - | 1.0 | 1.0 | 0.7 | 0.7 | 0.7 |
| NL/EL | - | - | 0.5 | 0.2 | 0.2 | 0.2 |
| SW/BW | 0.6 | - | - | 0.6 | 0.6 | 0.6 |
| Ds/Dm | 0.5 | - | - | 0.5 | 0.5 | 0.5 |
| WET PERFORMANCE INDEX | 100 | 100 | 100 | 105 | 110 | 108 |
| UNEVEN WEAR RESISTANCE INDEX | 100 | 90 | 95 | 108 | 100 | 110 |
| BLOCK BREAKAGE RESISTANCE INDEX | 100 | 100 | 95 | 100 | 100 | 100 |

FIG. 10A

| | EXAMPLE 4 | EXAMPLE 5 | EXAMPLE 6 | EXAMPLE 7 | EXAMPLE 8 | EXAMPLE 9 |
|---|---|---|---|---|---|---|
| POSITION OF END PORTION OF CENTER NARROW GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE |
| NUMBER OF ROWS OF CENTER BLOCK | 1 | 1 | 1 | 1 | 1 | 1 |
| NUMBER OF BENT PORTIONS IN CENTER LUG GROOVE | 2 | 2 | 2 | 2 | 2 | 2 |
| NUMBER OF BENT PORTIONS IN CENTER NARROW GROOVE | 2 | 2 | 2 | 2 | 2 | 2 |
| BW/TW | 0.5 | 0.4 | 0.4 | 0.3 | 0.3 | 0.3 |
| RL/BL | 0.08 | 0.5 | 0.1 | 0.4 | 0.3 | 0.3 |
| ANGLE α OF BENT PORTION IN CENTER LUG GROOVE | 100 | 100 | 100 | 100 | 40 | 50 |
| ANGLE β OF BENT PORTION IN CENTER NARROW GROOVE | 100 | 100 | 100 | 100 | 100 | 100 |
| Dc/Dr | 0.7 | 0.7 | 0.7 | 0.7 | 0.7 | 0.7 |
| NL/EL | 0.2 | 0.2 | 0.2 | 0.2 | 0.2 | 0.2 |
| SW/BW | 0.6 | 0.6 | 0.6 | 0.6 | 0.6 | 0.6 |
| Ds/Dm | 0.5 | 0.5 | 0.5 | 0.5 | 0.5 | 0.5 |
| WET PERFORMANCE INDEX | 110 | 108 | 110 | 115 | 118 | 120 |
| UNEVEN WEAR RESISTANCE INDEX | 105 | 118 | 113 | 115 | 115 | 115 |
| BLOCK BREAKAGE RESISTANCE INDEX | 100 | 100 | 100 | 100 | 95 | 100 |

FIG. 10B

| | EXAMPLE 10 | EXAMPLE 11 | EXAMPLE 12 | EXAMPLE 13 | EXAMPLE 14 | EXAMPLE 15 |
|---|---|---|---|---|---|---|
| POSITION OF END PORTION OF CENTER NARROW GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE |
| NUMBER OF ROWS OF CENTER BLOCK | 1 | 1 | 1 | 1 | 1 | 1 |
| NUMBER OF BENT PORTIONS IN CENTER LUG GROOVE | 2 | 2 | 2 | 2 | 2 | 2 |
| NUMBER OF BENT PORTIONS IN CENTER NARROW GROOVE | 2 | 2 | 2 | 2 | 2 | 2 |
| BW/TW | 0.3 | 0.3 | 0.3 | 0.3 | 0.3 | 0.3 |
| RL/BL | 0.3 | 0.3 | 0.3 | 0.3 | 0.3 | 0.3 |
| ANGLE α OF BENT PORTION IN CENTER LUG GROOVE | 90 | 70 | 70 | 70 | 70 | 70 |
| ANGLE β OF BENT PORTION IN CENTER NARROW GROOVE | 100 | 40 | 50 | 90 | 70 | 70 |
| Dc/Dr | 0.7 | 0.7 | 0.7 | 0.7 | 1.3 | 0.8 |
| NL/EL | 0.2 | 0.2 | 0.2 | 0.2 | 0.2 | 0.2 |
| SW/BW | 0.6 | 0.6 | 0.6 | 0.6 | 0.6 | 0.6 |
| Ds/Dm | 0.5 | 0.5 | 0.5 | 0.5 | 0.5 | 0.5 |
| WET PERFORMANCE INDEX | 115 | 123 | 125 | 120 | 120 | 128 |
| UNEVEN WEAR RESISTANCE INDEX | 115 | 115 | 115 | 115 | 115 | 115 |
| BLOCK BREAKAGE RESISTANCE INDEX | 105 | 100 | 105 | 108 | 106 | 107 |

FIG. 10C

| | EXAMPLE 16 | EXAMPLE 17 | EXAMPLE 18 | EXAMPLE 19 | EXAMPLE 20 |
|---|---|---|---|---|---|
| POSITION OF END PORTION OF CENTER NARROW GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE |
| NUMBER OF ROWS OF CENTER BLOCK | 1 | 1 | 1 | 1 | 1 |
| NUMBER OF BENT PORTIONS IN CENTER LUG GROOVE | 2 | 2 | 2 | 2 | 2 |
| NUMBER OF BENT PORTIONS IN CENTER NARROW GROOVE | 2 | 2 | 2 | 2 | 2 |
| BW/TW | 0.3 | 0.3 | 0.3 | 0.3 | 0.3 |
| RL/BL | 0.3 | 0.3 | 0.3 | 0.3 | 0.3 |
| ANGLE α OF BENT PORTION IN CENTER LUG GROOVE | 70 | 70 | 70 | 70 | 70 |
| ANGLE β OF BENT PORTION IN CENTER NARROW GROOVE | 70 | 70 | 70 | 70 | 70 |
| Dc/Dr | 1.2 | 1.0 | 1.0 | 1.0 | 1.0 |
| NL/EL | 0.2 | 0.3 | 0.5 | 0.4 | 0.4 |
| SW/BW | 0.6 | 0.6 | 0.6 | 0.2 | 0.3 |
| Ds/Dm | 0.5 | 0.5 | 0.5 | 0.5 | 0.5 |
| WET PERFORMANCE INDEX | 125 | 125 | 130 | 130 | 133 |
| UNEVEN WEAR RESISTANCE INDEX | 120 | 120 | 123 | 120 | 123 |
| BLOCK BREAKAGE RESISTANCE INDEX | 107 | 110 | 115 | 115 | 115 |

FIG. 10D

| | EXAMPLE 21 | EXAMPLE 22 | EXAMPLE 23 | EXAMPLE 24 | EXAMPLE 25 |
|---|---|---|---|---|---|
| POSITION OF END PORTION OF CENTER NARROW GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE | OPEN TO CIRCUMFERENTIAL MAIN GROOVE |
| NUMBER OF ROWS OF CENTER BLOCK | 1 | 1 | 1 | 1 | 1 |
| NUMBER OF BENT PORTIONS IN CENTER LUG GROOVE | 2 | 2 | 2 | 2 | 2 |
| NUMBER OF BENT PORTIONS IN CENTER NARROW GROOVE | 2 | 2 | 2 | 2 | 4 |
| BW/TW | 0.3 | 0.3 | 0.3 | 0.3 | 0.3 |
| RL/BL | 0.3 | 0.3 | 0.3 | 0.3 | 0.3 |
| ANGLE α OF BENT PORTION IN CENTER LUG GROOVE | 70 | 70 | 70 | 70 | 70 |
| ANGLE β OF BENT PORTION IN CENTER NARROW GROOVE | 70 | 70 | 70 | 70 | 70 |
| Dc/Dr | 1.0 | 1.0 | 1.0 | 1.0 | 1.0 |
| NL/EL | 0.4 | 0.4 | 0.4 | 0.4 | 0.4 |
| SW/BW | 0.5 | 0.4 | 0.4 | 0.4 | 0.4 |
| Ds/Dm | 0.5 | 0.95 | 0.6 | 0.9 | 0.8 |
| WET PERFORMANCE INDEX | 130 | 135 | 135 | 135 | 140 |
| UNEVEN WEAR RESISTANCE INDEX | 125 | 125 | 130 | 128 | 130 |
| BLOCK BREAKAGE RESISTANCE INDEX | 115 | 115 | 118 | 115 | 115 |

FIG. 10E

PNEUMATIC TIRE

TECHNICAL FIELD

The present technology relates to a pneumatic tire.

BACKGROUND ART

While pneumatic tires have grooves on tread surfaces to mainly ensure drainage properties, some known pneumatic tires improve traveling performance using these grooves. For example, a pneumatic tire described in Japan Patent No. 4149219 includes bent portions in center lateral grooves, which connect between two circumferential grooves extending in a zigzag manner along an equator of the tire, thus increasing edge components and achieving a tread pattern resistant to sideslip.

Since the grooves on the tread surface cause noise generated while the pneumatic tire is in rolling under load, some known pneumatic tires achieve a reduction in noise generated during the rolling under load. For example, a pneumatic tire described in Japan Patent No. 5425802 includes blocks defined by a plurality of grooves in block rows. The block is formed into a polygonal planar contour shape of a hexagon or a polygon of more sides. A minimum length of the block in a tread width direction is situated in an end portion in a tread circumferential direction, and a middle portion of the block in the tread circumferential direction has a width wider than a width of the end portion in the circumferential direction. Leading edges of the blocks while the tire is rolling under load are spaced from one another in the tread circumferential direction. The pneumatic tire described in Japan Patent No. 5425802 configures the blocks in the block rows in this manner to suppress large collision noise caused by the simultaneous collision of the plurality of blocks with a road surface.

Here, grounding characteristics of the pneumatic tire change depending on the weight of a vehicle during traveling. In particular, in a truck or a bus generating a large difference between a weight without goods loaded and a weight with goods fully loaded, the change in grounding characteristics associated with the change in the weight of the vehicle becomes significant. For example, when the truck or the bus is in an empty vehicle state where no goods are loaded, a ground contact area of the pneumatic tire with the road surface decreases compared with that in a loading state where the goods are loaded. In this case, grooves positioned in the ground contact area also decrease, and this possibly results in the deterioration of drainage properties and deterioration of wet performance.

On the other hand, the grooves formed in the tread surface contribute to the rigidity of the blocks defined by the grooves. A decrease in the size of the blocks by increasing the groove area in the tread surface deteriorates the rigidity of the blocks. The tread surface is likely to wear at a position with the low rigidity of the blocks compared with that at a position with the high rigidity of the blocks. Accordingly, in a case where the groove area is increased to improve wet property and consequently a portion with the low rigidity of the block occurs, wear is likely to occur in the portion, and an uneven wear is likely to occur. In this manner, although the wet performance—traveling performance in the traveling on a wet road surface—can be improved by increasing the groove area, increasing the groove area makes the uneven wear likely to occur, and thus improving both trade-off performances was extremely difficult.

SUMMARY

The present technology provides a pneumatic tire that can improve wet performance without deteriorating uneven wear resistance.

A pneumatic tire according to embodiments of the present technology includes a pair of circumferential main grooves, a plurality of center lug grooves, and center blocks. The pair of circumferential main grooves are disposed on both sides of a tire equatorial plane in a tire lateral direction. The tire equatorial plane is interposed between the pair of circumferential main grooves. The pair of circumferential main grooves extend in a tire circumferential direction and oscillate in the tire lateral direction. The plurality of center lug grooves have both ends connected to the pair of circumferential main grooves. The center blocks are defined by the center lug grooves and the pair of circumferential main grooves. The center lug grooves have bent portions at two or more positions. The center blocks include center narrow grooves having both ends connected to the pair of circumferential main grooves. The center narrow grooves have bent portions at two or more positions.

In the pneumatic tire described above, preferably the center blocks have a maximum width BW in the tire lateral direction with respect to a developed tread width TW in a range of $0.2 \leq (BW/TW) \leq 0.5$.

In the pneumatic tire described above, the following is preferable. The center blocks include overlapping regions where positions in the tire circumferential direction are same between the center blocks adjacent in the tire circumferential direction. The overlapping regions have a length RL in the tire circumferential direction with respect to a length BL of the center blocks in the tire circumferential direction in a range of $0.1 \leq (RL/BL) \leq 0.4$.

In the pneumatic tire described above, preferably the center lug grooves have the bent portions with an angle α of a minor angle in a range of from 50° or more to 90° or less.

In the pneumatic tire described above, preferably the center narrow grooves have the bent portions with an angle β of a minor angle in a range of from 50° or more to 90° or less.

In the pneumatic tire described above, preferably, the center narrow grooves have a relationship between a groove depth Dc of circumferential extending portions extending in the tire circumferential direction and a groove depth Dr of width direction extending portions extending in the tire lateral direction in a range of $0.8 \leq (Dc/Dr) \leq 1.2$.

In the pneumatic tire described above, preferably, the center narrow grooves have a distance NL between a connection portion of the center narrow groove and a connection portion of the center lug groove connected to the same circumferential main groove in the tire circumferential direction with respect to a distance EL between the center lug grooves in the tire circumferential direction in a range of $0.3 \leq (NL/EL) \leq 0.5$.

In the pneumatic tire described above, preferably, the center lug grooves include raised bottom portions on groove bottoms. The raised bottom portions have a width SW of a range where the raised bottom portion is provided in the tire lateral direction with respect to the maximum width BW of the center block in the tire lateral direction in a range of $0.3 \leq (SW/BW) \leq 0.5$.

In the pneumatic tire described above, preferably, the center lug grooves have a groove depth Ds at a position where the raised bottom portion is formed with respect to a groove depth Dm of the circumferential main groove in a range of $0.6 \leq (Ds/Dm) \leq 0.9$.

In the pneumatic tire described above, the following is preferable. The bent portions are provided in the center lug groove at two positions. The bent portions are provided in the center narrow groove at four positions.

In the pneumatic tire described above, preferably the center narrow groove in a range between the connection portion to the circumferential main groove and the bent portion is formed to be approximately parallel to the center lug groove in a range between the connection portion to the same circumferential main groove and the bent portion.

The pneumatic tire according to an embodiment of the present technology provides an effect of ensuring that wet performance is improved without deteriorating uneven wear resistance.

BRIEF DESCRIPTION OF DRAWINGS

FIG. 10A is a table showing results of a performance test of pneumatic tires.

FIG. 10B is a table showing results of the performance test of pneumatic tires.

FIG. 10C is a table showing results of the performance tests of pneumatic tires.

FIG. 10D is a table showing results of the performance tests of pneumatic tires.

FIG. 10E is a table showing results of the performance tests of pneumatic tires.

DETAILED DESCRIPTION

Pneumatic tires according to embodiments of the present technology are described in detail below with reference to the drawings. However, the present technology is not limited by the embodiment. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Embodiments

Figure 1:
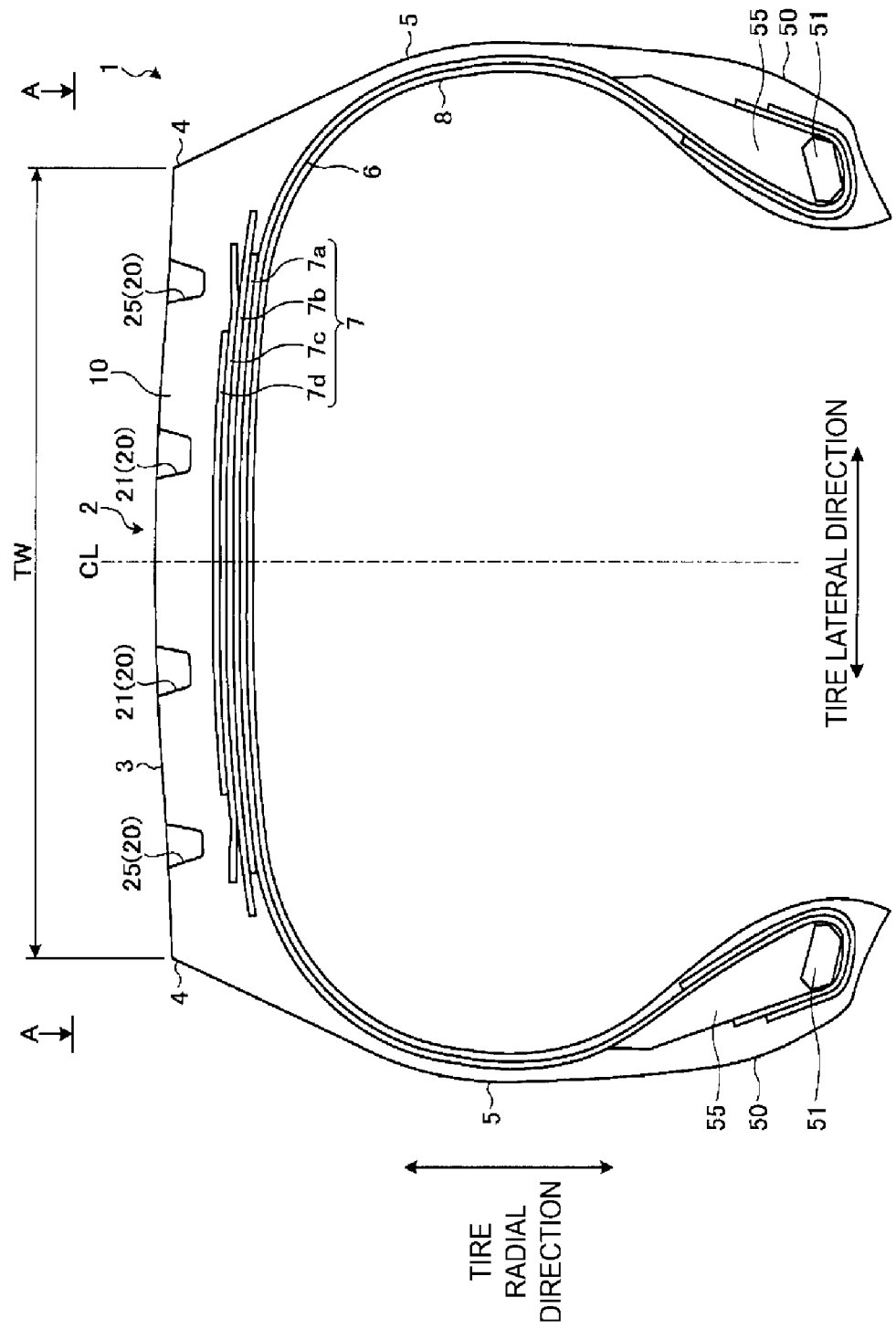
FIG. 1 is a meridian cross-sectional view illustrating a main portion of a pneumatic tire according to an embodiment.

FIG. 1 is a meridian cross-sectional view illustrating a main portion of a pneumatic tire according to an embodiment. Viewing a pneumatic tire 1 illustrated in FIG. 1 in the meridian cross-sectional view, a tread portion 2 is disposed on the outermost portion in a tire radial direction. The surface of the tread portion 2, that is, a portion in contact with a road surface while a vehicle (not illustrated) to which this pneumatic tire 1 is mounted is traveling is formed as a tread surface 3. A plurality of circumferential main grooves 20 extending in a tire circumferential direction are formed in the tread surface 3. A plurality of lug grooves 30 (see FIG. 2) intersecting with the circumferential main grooves 20 are formed. A plurality of land portions 10 are defined by the plurality of circumferential main grooves 20 and the lug grooves 30 on the tread surface 3.

Both ends of the tread portion 2 in the tire lateral direction are formed as shoulder portions 4. Sidewall portions 5 are disposed from the shoulder portions 4 to predetermined positions inward in the tire radial direction. In other words, the sidewall portions 5 are disposed at two positions on both sides of the pneumatic tire 1 in the tire lateral direction.

Furthermore, respective bead portions 50 are located inward in the tire radial direction of the respective sidewall portions 5. The bead portions 50 are disposed at two positions on both sides of a tire equatorial plane CL similarly to the sidewall portions 5. In other words, the pair of the bead portions 50 are disposed on both sides of the tire equatorial plane CL in the tire lateral direction. The pair of respective bead portions 50 include bead cores 51, and bead fillers 55 are provided outward in the tire radial direction of the respective bead cores 51. The bead core 51 is formed by winding a bead wire, which is a steel wire, into an annular shape. The bead filler 55 is a rubber material disposed in a space and is formed by folding back an end portion of a carcass 6 described later outward in the tire lateral direction at the position of the bead core 51.

A belt layer 7 is provided inward in the tire radial direction of the tread portion 2. The belt layer 7 has a multilayer structure formed by stacking, for example, four layers, belts 7a, 7b, 7c, and 7d. A plurality of belt cords made of steel or an organic fiber material such as polyester, rayon, or nylon are coated with coating rubber, and then a rolling process is performed, thus configuring the belt layer 7. Furthermore, the belts 7a, 7b, 7c, and 7d are configured as so-called crossply structure in which belt angles defined as inclination angles of the belt cords in the tire lateral direction with respect to the tire circumferential direction differ from one another, and the belts 7a, 7b, 7c, and 7d are layered with the inclination directions of the belt cords intersecting with one another.

The carcass 6, which internally includes cords of radial ply, is provided in a continuous manner inward in the tire radial direction of the belt layer 7 and on the tire equatorial plane CL side of the sidewall portions 5. The carcass 6 has a single layer structure formed of one carcass ply or a multilayer structure formed by stacking a plurality of carcass plies and is bridged between the bead cores 51, which are disposed on both sides in the tire lateral direction, in a toroidal shape to form a framework of the tire. In detail, the carcass 6 is disposed from one bead portion 50 to the other bead portion 50 among the pair of bead portions 50 located on both sides in the tire lateral direction and wound back outward in the tire lateral direction along the bead cores 51 at the bead portions 50 so as to wrap the bead cores 51 and the bead fillers 55. A steel cord as a carcass cord made of a steel material is used as the carcass ply of the carcass 6 thus disposed, the plurality of steel cords are coated with coating rubber, and then a rolling process is performed, thus configuring the carcass ply. In other words, the carcass 6 is formed of a steel carcass material.

Additionally, an innerliner 8 is formed inward of the carcass 6 or inside this carcass 6 in the pneumatic tire 1 along the carcass 6.

Figure 2:
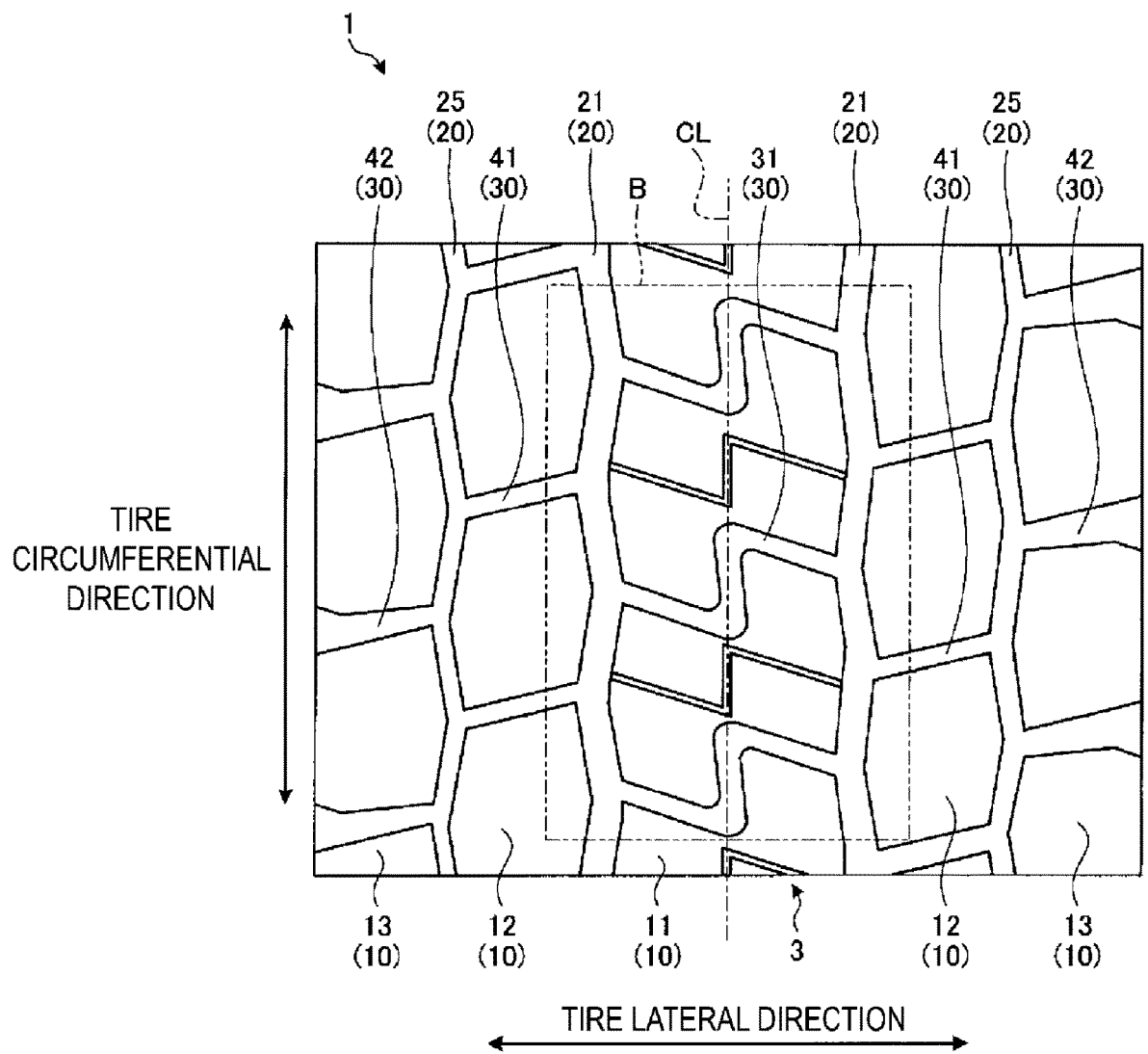
FIG. 2 is a diagram viewed from the arrow A-A of FIG. 1.

FIG. 2 is a drawing viewed from the arrow A-A of FIG. 1. The circumferential main groove 20 formed in the tread surface 3 includes a pair of inner circumferential main grooves 21 and a pair of outer circumferential main grooves 25. The pair of inner circumferential main grooves 21 are disposed on both sides of the tire equatorial plane CL in the tire lateral direction between which the tire equatorial plane CL is interposed and extend in the tire circumferential direction. The pair of outer circumferential main grooves 25 are disposed outside the pair of respective inner circumferential main grooves 21 in the tire lateral direction, have groove widths narrower than groove widths of the inner circumferential main grooves 21, and extend in the tire circumferential direction. In other words, in the inner circumferential main grooves 21, the two inner circumferential main grooves 21 are disposed on both sides of the tire equatorial plane CL in the tire lateral direction. In the outer circumferential main grooves 25, the two outer circumferential main grooves 25 are disposed on both sides of the two inner circumferential main grooves 21 in the tire lateral direction between which the two inner circumferential main grooves 21 are interposed in the tire lateral direction. These respective inner circumferential main grooves 21 and outer circumferential main grooves 25 repeatedly oscillate in the tire lateral direction while extending in the tire circumferential direction. That is, the inner circumferential main grooves 21 and the outer circumferential main grooves 25 are both formed in a zigzag-like manner.

Note that the inner circumferential main groove 21 has the groove width in a range of from 6 mm or more to 15 mm or less and a groove depth in a range of from 10 mm or more to 26 mm or less. Additionally, the outer circumferential main groove 25 has the groove width in a range of from 4 mm or more to 15 mm or less and a groove depth in a range of from 6 mm or more to 26 mm or less.

In addition to the circumferential main grooves 20, the plurality of lug grooves 30 extending in the tire lateral direction are provided in the tread surface 3. The lug groove 30 includes center lug grooves 31, intermediate lug grooves 41, and shoulder lug grooves 42. Among these grooves, the center lug grooves 31 are disposed between the pair of inner circumferential main grooves 21 in the tire lateral direction and have both ends as the lug grooves 30 connected to the pair of inner circumferential main grooves 21. The intermediate lug grooves 41 are disposed between the inner circumferential main grooves 21 and the outer circumferential main grooves 25 adjacent to one another in the tire lateral direction and have both ends as the lug grooves 30 connected to the inner circumferential main grooves 21 and the outer circumferential main grooves 25. The shoulder lug grooves 42 are disposed outside the outer circumferential main grooves 25 in the tire lateral direction and have one end as the lug grooves 30 connected to the outer circumferential main grooves 25. The plurality of respective center lug grooves 31, intermediate lug grooves 41, and shoulder lug grooves 42 are provided aligned in the tire circumferential direction. Additionally, pitches of the center lug grooves 31, the intermediate lug grooves 41, and the shoulder lug grooves 42 in the tire circumferential direction have the same size as pitches of oscillations in the tire lateral direction of the inner circumferential main grooves 21 and the outer circumferential main grooves 25 in the tire circumferential direction.

Note that the center lug groove 31 has a groove width in a range of from 4 mm or more to 12 mm or less and a groove depth in a range of from 9 mm or more to 26 mm or less. The intermediate lug groove 41 has a groove width in a range of from 4 mm or more to 9 mm or less and a groove depth in a range of from 2 mm or more to 26 mm or less. Additionally, the shoulder lug groove 42 has a groove width in a range of from 4 mm or more to 16 mm or less, and a groove depth in a range of from 2 mm or more to 16 mm or less.

While the center lug grooves 31 and the intermediate lug grooves 41 are connected to the common inner circumferential main groove 21, positions of portions connected to the inner circumferential main groove 21 in the tire circumferential direction differ between the center lug grooves 31 and the intermediate lug grooves 41. Likewise, while the intermediate lug grooves 41 and the shoulder lug grooves 42 are connected to the common outer circumferential main groove 25, positions of portions connected to the outer circumferential main groove 25 in the tire circumferential direction differ between the intermediate lug grooves 41 and the shoulder lug grooves 42.

Center blocks 11, intermediate blocks 12, and shoulder blocks 13 are defined in the land portions 10 formed in the tread surface 3 by the plurality of lug grooves 30 and the plurality of circumferential main grooves 20. Among these blocks, the center blocks 11 are the land portions 10 defined by the adjacent center lug grooves 31 and the pair of inner circumferential main grooves 21. Accordingly, the center blocks 11 are located on the tire equatorial plane CL across the tire equatorial plane CL. The intermediate blocks 12 are the land portions 10 defined by the adjacent inner circumferential main groove 21 and outer circumferential main groove 25; and the adjacent intermediate lug grooves 41. Additionally, the shoulder blocks 13 are the land portions 10 provided outside the outer circumferential main grooves 25 in the tire lateral direction, defined by the adjacent shoulder lug grooves 42 and defined by the outer circumferential main grooves 25 at the inner portions in the tire lateral direction. In other words, the shoulder blocks 13 are defined by the outer circumferential main grooves 25 and the shoulder lug grooves 42.

The plurality of respective center blocks 11, intermediate blocks 12, and shoulder blocks 13 are provided aligned in the tire circumferential direction and constitute block rows aligned in the tire circumferential direction. For example, the center blocks 11 constitute a single block row located between the pair of inner circumferential main grooves 21 and located on the tire equatorial plane CL. Similarly, the intermediate blocks 12 constitute a single block row located between the inner circumferential main groove 21 and the outer circumferential main groove 25. The shoulder blocks 13 constitute a single block row positioned outside the outer circumferential main groove 25 in the tire lateral direction adjacent to the outer circumferential main groove 25.

Figure 3:
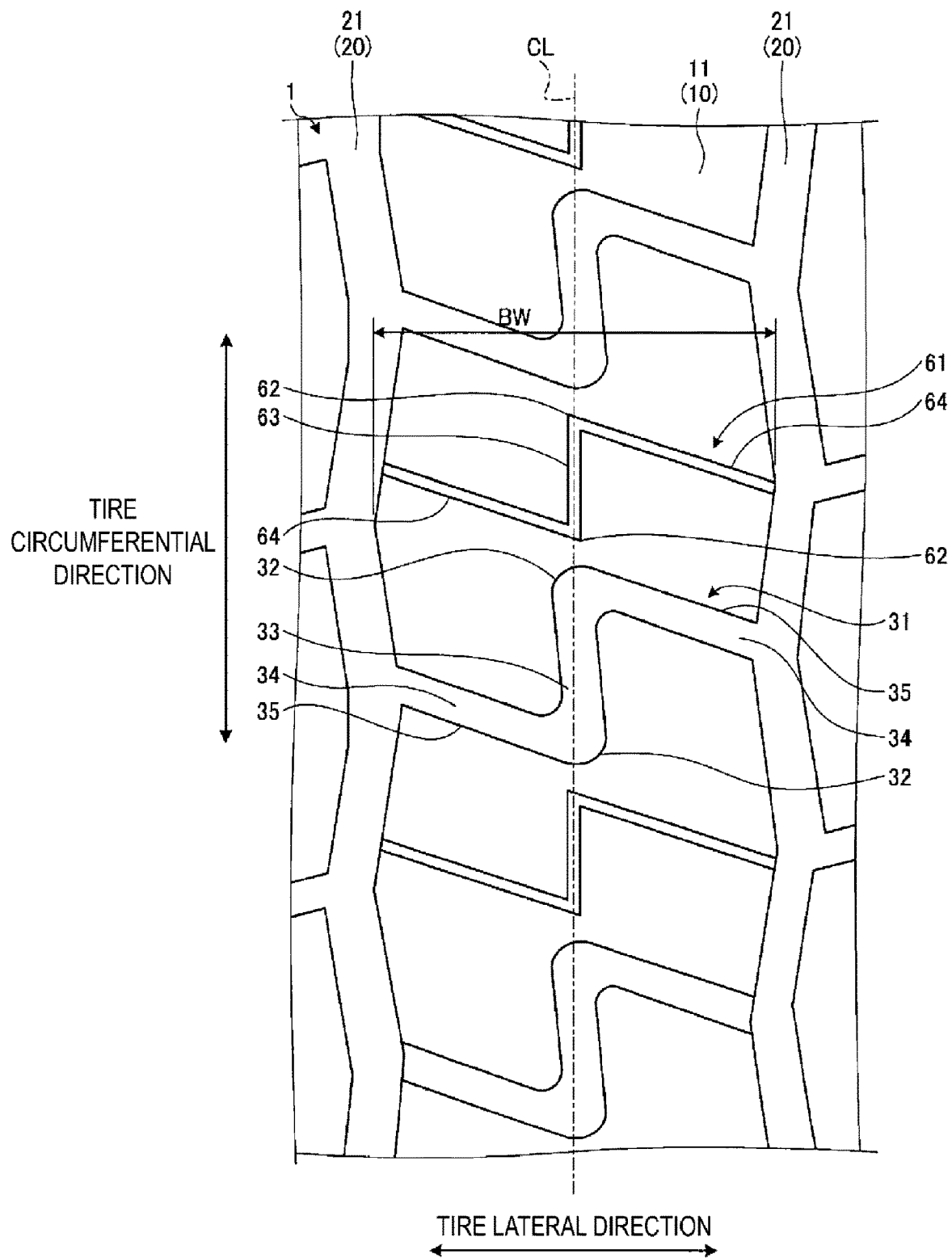
FIG. 3 is a detailed view of portion B of FIG. 2.

FIG. 3 is a detailed view of portion B of FIG. 2. In the lug grooves 30 defining the land portions 10, the center lug grooves 31 bend at a plurality of positions to have circumferential extending portions 33 extending in the tire circumferential direction and width direction extending portions 34 extending in the tire lateral direction. The circumferential extending portion 33 in this case refers to a portion in the center lug groove 31 formed with an inclination angle in the tire lateral direction with respect to the tire circumferential direction of 45° or less. The width direction extending portion 34 refers to a portion in the center lug groove 31 formed with an inclination angle in the tire lateral direction with respect to the tire circumferential direction of more than 45°.

Specifically, one center lug groove 31 has bent portions 32, which are portions bent, at two positions and is formed in a crank shape by the bending at the two bent portions 32. The bent portions 32 of the center lug groove 31 are formed into a curved line shape or an arc shape, and portions of the center lug groove 31 on both sides of the bent portion 32 are connected with the arc-shaped bent portion 32. Also, the center lug grooves 31 are formed between the pair of inner circumferential main grooves 21 with both edges 35—openings to the tread surface 3, that is, the edges 35 on both sides in the groove width direction—not terminating in the center block 11. In other words, the center lug grooves 31 do not have protruding portions protruding into the center blocks 11 and terminating in the center blocks 11 and are formed between the pair of inner circumferential main grooves 21 in the crank shape without having the protruding portions.

The crank-shaped center lug grooves 31 are formed as the circumferential extending portions 33 at positions interposed between the bent portions 32 at the two positions. The circumferential extending portions 33 are formed on the tire equatorial plane CL and are inclined in the tire lateral direction with respect to the tire circumferential direction within a predetermined range. The inclination angle of the circumferential extending portion 33 with respect to the tire circumferential direction is in a range of from 0° or more to 15° or less. Note that all portions of the circumferential extending portions 33 need not be located on the tire equatorial plane CL, a part of the positions may be located on the tire equatorial plane CL, and the other portions need not be located on the tire equatorial plane CL.

Additionally, the width direction extending portions 34 extend in the tire lateral direction from the end portions of the circumferential extending portions 33 to connect the end portions of the circumferential extending portions 33 with the inner circumferential main grooves 21, that is, the bent portions 32 and the inner circumferential main grooves 21. In detail, the width direction extending portions 34 are provided at two positions in each center lug groove 31, and the width direction extending portions 34, provided at the two positions, connect the bent portions 32 different from one another with the different inner circumferential main grooves 21 in the pair of inner circumferential main grooves 21. At the time, the width direction extending portion 34 connects a position in the inner circumferential main groove 21 concaved and bent toward the inside in the tire lateral direction with the bent portion 32.

The respective width direction extending portions 34 at the two positions are inclined in the same direction in the tire circumferential direction while extending in the tire lateral direction. In detail, the width direction extending portion 34 is inclined to the same side as the side the circumferential extending portion 33 inclines to, which constitutes the bent portion 32 together with this width direction extending portion 34, and is inclined in the tire circumferential direction with respect to the tire lateral direction at an angle different from the inclination angle of the circumferential extending portion 33. The inclination angles of the width direction extending portions 34 at the two positions provided in one center lug groove 31 with respect to the tire lateral direction are approximately the same angles.

Additionally, the center block 11 includes center narrow grooves 61. The center narrow groove 61 has both ends connected to the pair of inner circumferential main grooves 21 and has bent portions 62 at two positions. Respective both ends of the center narrow groove 61 are connected to portions near the positions convexed and bent outside in the tire lateral direction in the inner circumferential main grooves 21. The bent portions 62 of the center narrow groove 61 are formed into an angular shape, and portions of the center narrow groove 61 on both sides of the bent portion 62 are connected in an angular manner with the bent portion 62. The center narrow groove 61 thus having the bent portions 62 at the two positions has a crank shape similarly to the center lug groove 31. Similarly to the center lug groove 31, the center narrow groove 61 includes a circumferential extending portion 63 extending in the tire circumferential direction and a width direction extending portion 64 extending in the tire lateral direction. The embodiment of the crank in this case is the same embodiment as the embodiment of the crank of the center lug groove 31. In other words, the direction in which the width direction extending portion 64 extends from the end portion of the circumferential extending portion 63 in the center narrow groove 61 is the same direction as the direction in which the width direction extending portion 34 extends from the end portion of the circumferential extending portion 33 in the center lug groove 31.

Note that, the circumferential extending portion 63 in this case refers to a portion in the center narrow groove 61 formed with an inclination angle in the tire lateral direction with respect to the tire circumferential direction of 45° or less, and the width direction extending portion 64 refers to a portion in the center narrow groove 61 formed with an inclination angle in the tire lateral direction with respect to the tire circumferential direction of more than 45°. The respective lengths of the circumferential extending portion 63 and the width direction extending portion 64 are preferably 8 mm or more.

Additionally, the center narrow groove 61 has a groove depth in a range of from 1.0 mm or more to 3.0 mm or less and a groove width in a range of from 1.0 mm or more to 3 mm or less. Among them, the groove depths may differ between the circumferential extending portion 63 extending in the tire circumferential direction and the width direction extending portion 64 extending in the tire lateral direction within a predetermined range. Specifically, it is only required that the center narrow groove 61 have a relationship between a groove depth Dc of the circumferential extending portion 63 and a groove depth Dr of the width direction extending portion 64 in the range of $0.8 \leq (Dc/Dr) \leq 1.2$.

The center narrow groove 61 in a range between the connection portion to the inner circumferential main groove 21 and the bent portion 62 is formed to be approximately parallel to the center lug groove 31 in a range between the connection portion to the same inner circumferential main groove 21 and the bent portion 32. In other words, the center narrow groove 61 has the width direction extending portion 64 connected to the inner circumferential main groove 21 formed approximately parallel to the width direction extending portion 34 connected to the same inner circumferential main groove 21 in the center lug groove 31. Note that "approximately parallel" in this case refers to a state in which the relative angle becomes 5° or less.

The center block 11 has a maximum width BW in the tire lateral direction with respect to a developed tread width TW in the range of 0.2≤(BW/TW)≤0.5. In other words, the center block 11 is formed such that the maximum width BW in the tire lateral direction is in the range of from 20% or more to 50% or less of the developed tread width TW. The developed tread width TW in this case refers to a linear distance between both ends of the tread portion 2 in the tire lateral direction in a developed view when the pneumatic tire 1 is mounted on a specified rim, air is filled in the pneumatic tire 1 at a specified internal pressure, and a load is not applied—an unloaded state.

Note that "specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. The maximum width BW in the tire lateral direction of the center block 11 is preferably in a range of from 30% or more to 40% or less of the developed tread width TW.

Figure 4:
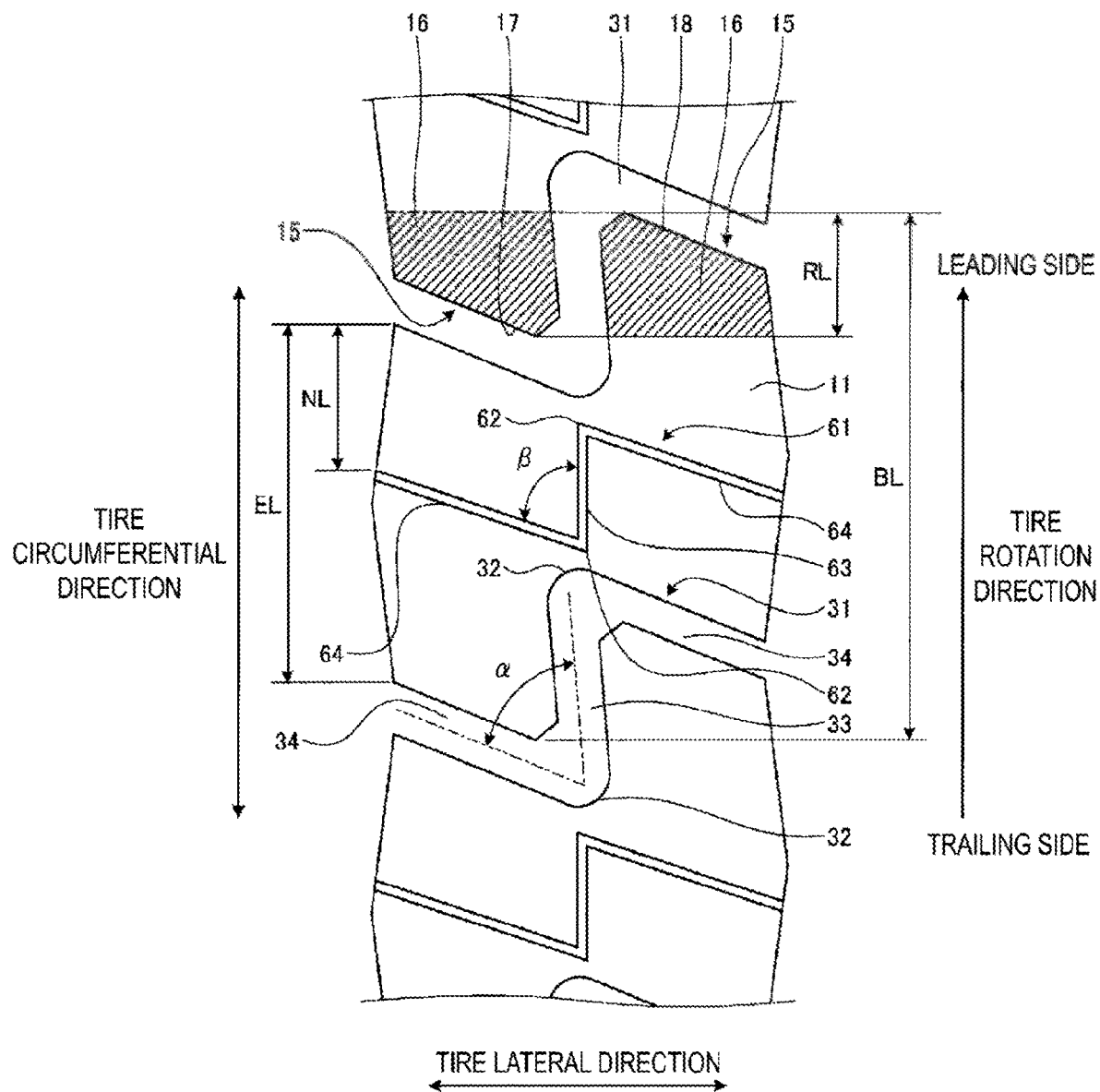
FIG. 4 is an explanatory diagram regarding a position of a center narrow groove and an overlapping region.

FIG. 4 is an explanatory diagram regarding the position of the center narrow groove and the overlapping region. The center narrow groove 61 has a distance NL between the connection portion of the center narrow groove 61 and the connection portion of the center lug groove 31 connected to the same inner circumferential main groove 21 in the tire circumferential direction with respect to a distance EL between the center lug grooves 31 in the tire circumferential direction in the range of 0.3≤(NL/EL)≤0.5. In this case, the distance NL between the connection portion of the center narrow groove 61 to the inner circumferential main groove 21 and the connection portion of the center lug groove 31 to the inner circumferential main groove 21 in the tire circumferential direction is a distance between a portion of the opening of the center narrow groove 61 open to the inner circumferential main groove 21 on the center lug groove 31 side and a portion of the opening of the center lug groove 31 open to the inner circumferential main groove 21 on the center narrow groove 61 side in the tire circumferential direction. Similarly, the distance EL between the center lug grooves 31 in the tire circumferential direction is a distance between portions of the openings of the center lug grooves 31 open to the inner circumferential main groove 21 located on each other center lug groove 31 sides in the tire circumferential direction. Also, the distance NL between the connection portion of the center narrow groove 61 to the inner circumferential main groove 21 and the connection portion of the center lug groove 31 to the inner circumferential main groove 21 in the tire circumferential direction is, among the center lug grooves 31 located on both sides in the tire circumferential direction viewed from the center narrow groove 61, a distance between the center narrow groove 61 and the center lug grooves 31 on the side having a closer distance between the connection portions to the inner circumferential main groove 21 in tire circumferential direction.

The center narrow groove 61 is formed with an angle β of a minor angle of the bent portion 62 in a range of from 50° or more to 90° or less. In other words, the center narrow groove 61 has the relative angle β between center lines of respective groove widths of the circumferential extending portion 63 and the width direction extending portion 64 intersecting at the bent portion 62 in a range of from 50° or more to 90° or less. Note that the angle β of the minor angle of the bent portion 62 of the center narrow groove 61 is preferably in a range of from 60° or more to 80° or less.

Additionally, the center lug groove 31 is also formed such that an angle α of a minor angle of the bent portion 32 in a range of from 50° or more to 90° or less. In other words, the center lug grooves 31 has the relative angle α between center lines of respective groove widths of the circumferential extending portion 33 and the width direction extending portion 34 intersecting at the bent portion 32 in a range of from 50° or more to 90° or less. Note that the angle α of the minor angle of the bent portions 32 of the center lug grooves 31 is preferably in a range of from 60° or more to 80° or less.

Additionally, in the center blocks 11, the center lug grooves 31 defining the center blocks 11 are formed into the crank shape to provide overlapping regions 16 where positions of the center blocks 11 adjacent to one another in the tire circumferential direction become the same positions in the tire circumferential direction. In other words, since the center lug grooves 31 are formed into the crank shape, the end portions of the center blocks 11 in the tire circumferential direction are formed with recesses and protrusions in the tire circumferential direction, and portions convexed in the tire circumferential direction are formed as protrusions 15.

In the center blocks 11 adjacent to one another in the tire circumferential direction, the opposed protrusions 15 are located at different positions in the tire lateral direction, and at least a part of the positions of the protrusions 15 in the tire circumferential direction are disposed to be the same positions. In this manner, the regions in the center blocks 11 adjacent to one another in the tire circumferential direction located at the same positions in the tire circumferential direction are the overlapping regions 16. The overlapping region 16 has a length RL in the tire circumferential direction with respect to a length BL of the center block 11 in the tire circumferential direction in the range of 0.1≤(RL/BL)≤0.4.

An application of the pneumatic tire 1 according to the embodiment thus configured is a heavy-duty pneumatic tire. To mount this pneumatic tire 1 on the vehicle, the pneumatic tire 1 is mounted on the vehicle in a state where the pneumatic tire 1 is mounted on a rim wheel and inflated. The pneumatic tires 1 mounted on the rim wheels are mounted on a large vehicle and used, for example, a truck and a bus.

When the vehicle on which the pneumatic tires 1 are mounted travels, the pneumatic tires 1 rotate while the tread surfaces 3 located downward in the tread surfaces 3 come into contact with the road surface. The vehicle travels by transmitting a driving force and a braking force to the road surface and generating a rotating force by a friction force between the tread surfaces 3 and the road surface. In traveling on a wet road surface, the vehicle travels while draining water between the tread surfaces 3 and the road surface by the grooves such as the circumferential main grooves 20 and the lug grooves 30. In other words, the water between the tread surfaces 3 and the road surface flows into the grooves, such as the circumferential main grooves 20 and the lug grooves 30, to discharge the water between the tread surfaces 3 and the road surface from between both. This facilitates the contact of the tread surfaces 3 with the road surface, and the friction force between the tread surfaces 3 and the road surface ensures steering stability during the traveling on the wet road surface.

Furthermore, the center lug groove 31 defining the center block 11 has the two bent portions 32. Accordingly, the center lug grooves 31 lengthen the entire length of the edges 35 compared with the case of the center lug grooves 31 being formed into a straight shape, ensuring that the edge components are increased. Thus, an increased edge effect caused by the lengthened entire length of the edges 35 of the center lug grooves 31 allows the friction force of the tread surfaces 3 against the road surface to be increased during the traveling on the wet road surface. Furthermore, the center lug groove 31 has the bent portions 32 at two positions to include the circumferential extending portion 33 and the width direction extending portion 34. Thus, the edge effect can be exhibited in a plurality of directions, and the friction force can be increased in the plurality of directions. Thus, wet performance can be improved.

Additionally, the center blocks 11 include the center narrow grooves 61 having both ends connected to the pair of inner circumferential main grooves 21. This allows the center blocks 11 to increase the edge components brought by the center narrow grooves 61, and the edge effect brought by the center narrow grooves 61 also allows the friction force of the tread surfaces 3 against the road surface to be increased during the traveling on the wet road surface. Furthermore, the center narrow groove 61 has the bent portions 62 at two positions to include the circumferential extending portion 63 and the width direction extending portion 64. Thus, the edge effect can be exhibited in a plurality of directions, and the friction force can be increased in the plurality of directions similarly to the center lug groove 31. Thus, wet performance can be improved.

Also, the center lug groove 31 has the bent portions 32 at two positions, and this provides the overlapping regions 16 in the center blocks 11 located on both sides of the center lug groove 31 in the tire circumferential direction defined by the center lug grooves 31. In other words, the overlapping regions 16 are formed of the protrusions 15 in the center blocks 11 adjacent to one another in the tire circumferential direction, and both protrusions 15 each have a trailing end portion 17 (see FIG. 4) or a leading end portion 18 (see FIG. 4) of the center block 11. Accordingly, by configuring the overlapping regions 16 by the protrusions 15 in the center blocks 11 adjacent to one another in the tire circumferential direction, the center blocks 11 adjacent to one another in the tire circumferential direction include the trailing end portion 17 in one center block 11 and the leading end portion 18 in the other center block 11 located at positions close to the centers in the tire circumferential direction of the respective opposite center blocks 11. Accordingly, while the vehicle on which the pneumatic tires 1 according to the embodiment are mounted is traveling, in the center blocks 11 adjacent to one another in the tire rotation direction, before the trailing end portion 17 in the center block 11 located on the leading side in the tire rotation direction is away from the road surface, the leading end portion 18 in the center block 11 located on the trailing side in the tire rotation direction contacts the road surface. Thus, the heel-and-toe wear of the center blocks 11 can be suppressed.

That is, when the trailing end portion 17 is away from the road surface during the traveling of the vehicle, the trailing end portion 17 slips on the road surface to cause wear, and the trailing end portion 17 wears more than the leading end portion 18, thus causing the heel-and-toe wear in general. In contrast, in the pneumatic tire 1 according to the embodiment, the leading end portion 18 in the center block 11 located on the trailing side in the tire rotation direction contacts the road surface before the trailing end portion 17 in the center block 11 located on the leading side in the tire rotation direction is away from the road surface. Accordingly, when the trailing end portion 17 in the center block 11 located on the leading side in the tire rotation direction is away from the road surface, a slip is less likely to occur, and the wear is less likely to occur. Thus, the speed of wear progression becomes almost the same between the trailing end portion 17 and the leading end portion 18 in the center blocks 11, and the heel-and-toe wear is less likely to occur. Thus, uneven wear resistance can be improved. As a result, wet performance can be improved without deteriorating the uneven wear resistance.

Further, since the maximum width BW of the center block 11 in the tire lateral direction with respect to the developed tread width TW is in the range of $0.2 \leq (BW/TW) \leq 0.5$, the wet performance can be improved while uneven wear is suppressed with more certainty. In other words, with the maximum width BW of the center block 11 in the tire lateral direction with respect to the developed tread width TW of $(BW/TW) < 0.2$, the length of the center lug groove 31 shortens as the width of the center block 11 in the tire lateral direction becomes narrow, thus deteriorating the drainage properties by the center lug groove 31. In particular, in a truck or a bus having a large difference between the weight of the empty vehicle and the weight of the vehicle loaded with goods, while the entire tread surface 3 in the tire lateral direction easily contacts the road surface due to the large ground contact load during the loading, the ground contact load decreases in regions on both end sides of the tread surface 3 in the tire lateral direction in the empty vehicle and the large ground contact load is received by the center region in the tire lateral direction. Accordingly, the grounding characteristics in the tire lateral direction are important for the truck and the bus; however, when the drainage properties by the center lug grooves 31 are deteriorated due to the shortened length of the center lug grooves 31, the drainage properties are deteriorated in the empty vehicle, possibly making the effective improvement in wet performance difficult. In other words, with $(BW/TW) < 0.2$, since the groove area located in the ground contact region decreases in the empty vehicle, the drainage properties are deteriorated, possibly making the improvement in wet performance difficult. In a case of the maximum width BW of the center block 11 in the tire lateral direction with respect to the developed tread width TW of $(BW/TW) > 0.5$, the width of the shoulder block 13 in the tire lateral direction becomes narrow as the width of the center block 11 in the tire lateral direction widens. Thus, the block rigidity of the shoulder block 13 is deteriorated, resulting in the heel-and-toe wear in the shoulder block 13, the shoulder region wears faster than other regions, and so-called shoulder wear possibly occurs, starting at the heel-and-toe wear.

In contrast, with the maximum width BW of the center block 11 in the tire lateral direction with respect to the developed tread width TW in the range of $0.2 \leq (BW/TW) \leq 0.5$, while the width of the shoulder block 13 in the tire lateral direction is ensured and the heel-and-toe wear and the shoulder wear of the shoulder block 13 are suppressed, the length of the center lug groove 31 can be ensured, and the drainage properties by the center lug groove 31 and the wet performance by the edge components can be improved. As a result, wet performance can be improved without deteriorating uneven wear resistance with more certainty.

In addition, since the length RL of the overlapping region 16 in the tire circumferential direction with respect to the length BL of the center block 11 in the tire circumferential direction is in the range of 0.1≤(RL/BL)≤0.4 in the center block 11, uneven wear can be suppressed while drainage properties are ensured with more certainty. That is, with the length RL of the overlapping region 16 in the tire circumferential direction with respect to the length BL of the center block 11 in the tire circumferential direction of (RL/BL) <0.1, the length RL of the overlapping region 16 in the tire circumferential direction is excessively short. Accordingly, effectively suppressing the heel-and-toe wear of the center block 11 possibly becomes difficult. In a case of the length RL of the overlapping region 16 in the tire circumferential direction with respect to the length BL of the center block 11 in the tire circumferential direction of (RL/BL)>0.4, the length of the circumferential extending portion 33 of the center lug groove 31 is excessively long. Accordingly, the water flowing into the center lug groove 31 accumulates in the circumferential extending portion 33, possibly making it difficult to flow the water from the center lug groove 31 to the inner circumferential main groove 21. In this case, improving wet performance possibly becomes difficult.

In contrast, with the lengths RL of the overlapping regions 16 in the tire circumferential direction with respect to the lengths BL of the center blocks 11 in the tire circumferential direction in the range of 0.1≤(RL/BL)≤0.4, the lengths RL of the overlapping regions 16 in the tire circumferential direction can be ensured and uneven wear can suppressed while the lengths of the circumferential extending portions 33 of the center lug grooves 31 are suppressed from being excessively long and drainage properties are ensured. As a result, wet performance can be improved without deteriorating uneven wear resistance with more certainty.

In addition, since the angles α of the minor angles of the bent portions 32 are in a range of from 50° or more to 90° or less in the center lug grooves 31, while the breakage of the block is suppressed, the heel-and-toe wear can be suppressed, and the wet performance by the center lug grooves 31 can be ensured with more certainty. In other words, with the angles α of the bent portions 32 of the center lug grooves 31 of less than 50°, the bent portions 32 have excessively acute angles, so the rigidity of the portions located on the minor sides of the bent portions 32 in the center blocks 11 is deteriorated and separation possibly occurs. In other words, the breakage of the block possibly occurs at the portions located on the minor sides of the bent portions 32 in the center blocks 11. In addition, with the angles α of the bent portions 32 of the center lug grooves 31 greater than 90°, the center lug grooves 31 become close to a straight shape, so the entire lengths of the center lug grooves 31 become shorter than a case where the angles α of the bent portions 32 are 90° or less. In this case, the overall lengths of the edges 35 of the center lug grooves 31 also shorten. Accordingly, it may be difficult to effectively obtain the effect of improvement in wet performance brought by increasing the edge components in the plurality of directions by providing the bent portions 32 at two positions in the center lug grooves 31 possibly becomes difficult. In a case of the angles α of the bent portions 32 of the center lug grooves 31 greater than 90°, the shapes of the protrusions 15 in the center blocks 11 become narrow in width in the tire lateral direction toward both ends in the tire circumferential direction and become tapered shapes. Thus, the rigidity of the protrusions 15 is likely to be deteriorated. In this case, suppressing the wear of the protrusions 15 becomes difficult, possibly making effectively suppressing the heel-and-toe wear difficult.

In contrast, with the angles α of the minor angles of the bent portions 32 of the center lug grooves 31 in a range of from 50° or more to 90° or less, while the rigidity of the portions located on the minor angle sides of the bent portions 32 in the center blocks 11 is ensured and the breakage of the block is suppressed, the entire lengths of the center lug grooves 31 are ensured that wet performance is ensured. Furthermore, the protrusions 15 in the center blocks 11 are suppressed to have tapered shapes to ensure suppressing the heel-and-toe wear with more certainty. As a result, wet performance can be improved without deteriorating the uneven wear resistance with more certainty, and further block breakage resistance can be improved.

In addition, since the angles β of the minor angles of the bent portions 62 are in a range of from 50° or more to 90° or less in the center narrow grooves 61, while the breakage of the block is suppressed, the wet performance by the center narrow grooves 61 can be ensured with more certainty. In other words, with the angles β of the bent portions 62 of the center narrow grooves 61 of less than 50°, the bent portions 62 have excessively acute angles, so the rigidity of the portions located on the minor sides of the bent portions 62 in the center blocks 11 is deteriorated and the breakage of the block possibly occurs. In addition, with the angles β of the bent portions 62 of the center narrow grooves 61 greater than 90°, the center narrow grooves 61 become close to a straight shape, so the entire lengths of the center narrow grooves 61 become shorter than a case where the angles β of the bent portions 62 are 90° or less. In this case, it may be difficult to effectively obtain the effect of improvement in wet performance brought by increasing the edge components in the plurality of directions by providing the bent portions 62 at two positions in the center narrow grooves 61.

In contrast, with the angles β of the minor angles of the bent portions 62 of the center narrow grooves 61 in a range of from 50° or more to 90° or less, while the rigidity of the portions located on the minor angle sides of the bent portions 62 in the center blocks 11 is ensured and the breakage of the block is suppressed, the entire lengths of the center narrow grooves 61 are ensured that wet performance is ensured. As a result, wet performance can be improved with more certainty, and further block breakage resistance can be improved.

In addition, since the relationship between groove depths Dc of the circumferential extending portions 63 and groove depths Dr of the width direction extending portions 64 in the center narrow grooves 61 is in the range of 0.8≤(Dc/Dr)≤1.2, the heel-and-toe wear of the center blocks 11 can be suppressed with more certainty while the drainage properties by the center narrow groove 61 are ensured. In other words, with the relationship between the groove depths Dc of the circumferential extending portions 63 and the groove depths Dr of the width direction extending portions 64 in the center narrow grooves 61 of (Dc/Dr)<0.8, the groove depths Dr of the width direction extending portions 64 are excessively deep. Accordingly, suppressing the heel-and-toe wear of the center blocks 11 possibly becomes difficult. That is, regarding the heel-and-toe wear of blocks, generally, when blocks are defined by deep grooves extending in a tire lateral direction, speed of wear progression is likely to differ between regions on both sides divided by the grooves, and the heel-and-toe wear is likely to occur caused by this. Accordingly, in a case where the groove depths Dr of the width direction extending portions 64 are excessively deep as well, the speed of wear progression is likely to differ between both sides of the width direction extending portions 64 in the center blocks 11, possibly making it difficult to suppress the heel-and-toe wear. In a case of the relationship between the groove depths Dc of the circumferential extending portions 63 and the groove depths Dr of the width direction extending portions 64 in the center narrow grooves 61 of (Dc/Dr)>1.2, the water that has entered into the center narrow grooves 61 is likely to accumulate in the circumferential extending portions 63. Thus, the water is less likely to be drained from the center narrow grooves 61 to the inner circumferential main grooves 21. In addition to the edge effect, the center narrow grooves 61 have an effect of flowing the water entering into the center narrow grooves 61 to the inner circumferential main grooves 21 to drain the water between the tread surfaces 3 and the road surface to the inner circumferential main groove 21. However, in a case where the water in the center narrow grooves 61 is likely to accumulate in the circumferential extending portions 63 due to the excessively deep groove depths Dc of the circumferential extending portions 63, the drainage properties by the center narrow grooves 61 are deteriorated.

In contrast, with the relationship between the groove depths Dc of the circumferential extending portions 63 and the groove depths Dr of the width direction extending portions 64 in the center narrow grooves 61 in the range of 0.8≤(Dc/Dr)≤1.2, while the accumulation of the water in the circumferential extending portions 63 is suppressed and the drainage properties by the center narrow grooves 61 are ensured, the heel-and-toe wear caused by the excessively deep groove depths Dr of the width direction extending portions 64 can be suppressed. As a result, wet performance can be improved without deteriorating uneven wear resistance with more certainty.

In the center narrow groove 61, the distance NL between the connection portion of the center narrow groove 61 and the connection portion of the center lug groove 31 in the tire circumferential direction connected to the same inner circumferential main groove 21 with respect to the distance EL between the center lug grooves 31 in the tire circumferential direction is in the range of 0.3≤(NL/EL)≤0.5, ensuring that the breakage of the block of the center block 11 is suppressed with more certainty. In other words, with (NL/EL) <0.3 or (NL/EL)>0.5, the distance NL between the connection portion of the center narrow groove 61 and the connection portion of the center lug groove 31 to the inner circumferential main groove 21 is excessively short. Accordingly, the rigidity between both connection portions in the center block 11 is deteriorated, possibly causing the breakage of the block. In contrast, in the range of 0.3≤(NL/EL)≤0.5, since the distance NL between the connection portion of the center narrow groove 61 and the connection portion of the center lug groove 31 to the inner circumferential main groove 21 can be ensured, the rigidity between both connection portions in the center block 11 can be ensured, thus ensuring that the breakage of the block is suppressed. As a result, block breakage resistance can be improved with more certainty.

The width direction extending portion 64 in the center narrow groove 61 connected to the inner circumferential main groove 21 is formed approximately parallel to the width direction extending portion 34 in the center lug groove 31 connected to the same inner circumferential main groove 21, ensuring that the breakage of the block is suppressed with more certainty. In other words, in a case where the width direction extending portion 64 in the center narrow groove 61 and the width direction extending portion 34 in the center lug groove 31 are not approximately parallel, a portion where the distance between the width direction extending portion 64 and the width direction extending portion 34 becomes excessively short is possibly generated. In this case, stress concentrates on the portion where the distance is short, possibly resulting in the breakage of the block. In contrast, when the width direction extending portion 64 in the center narrow groove 61 and the width direction extending portion 34 in the center lug groove 31 are formed to be approximately parallel, generating the portion where the distance between the width direction extending portion 64 and the width direction extending portion 34 becomes excessively short can be suppressed, ensuring that the breakage of block is suppressed with more certainty. As a result, block breakage resistance can be improved with more certainty.

Figure 5:
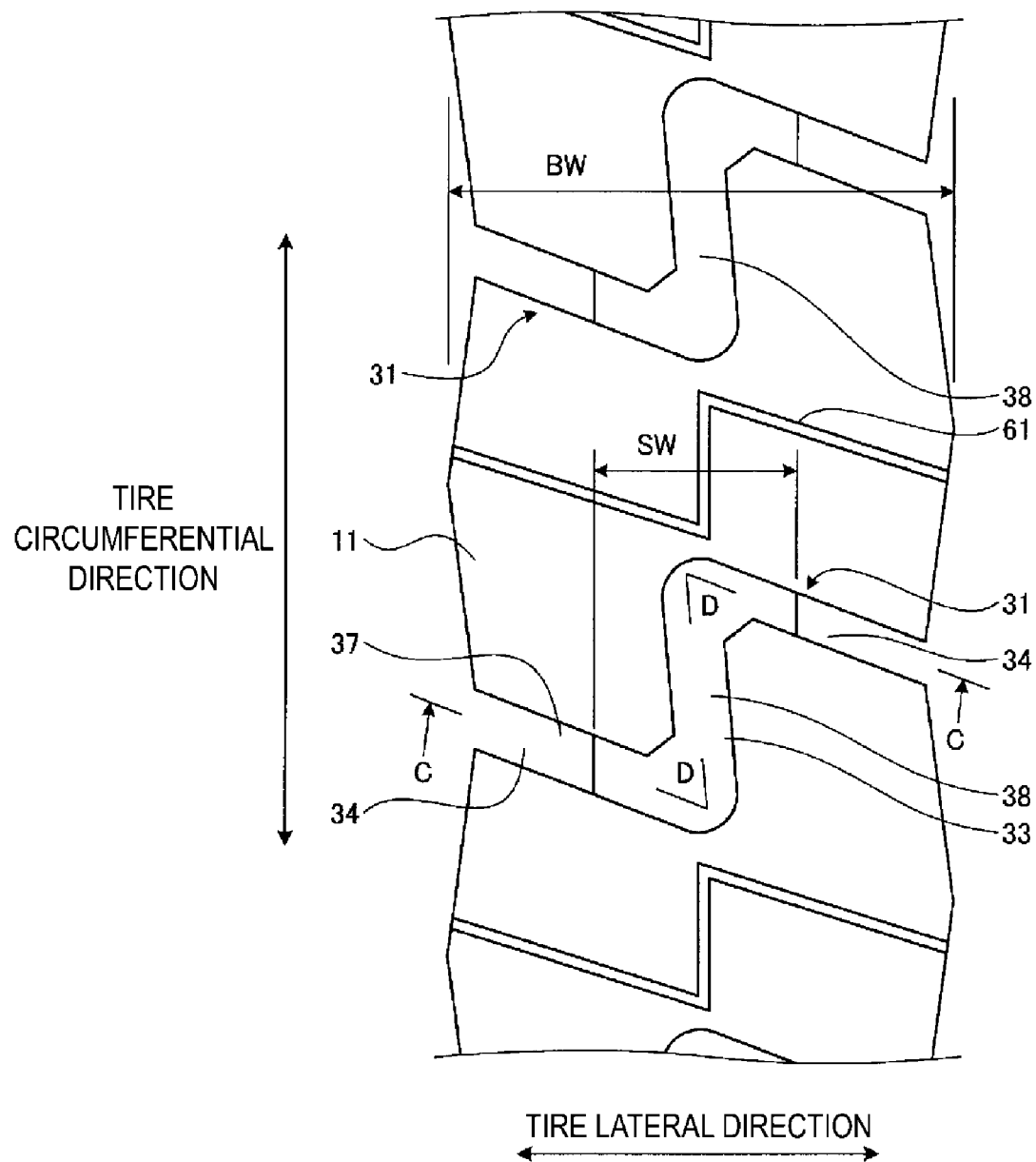
FIG. 5 is a modified example of the pneumatic tire according to the embodiment and is an explanatory diagram in a case where raised bottom portions are formed in center lug grooves.
Figure 6:
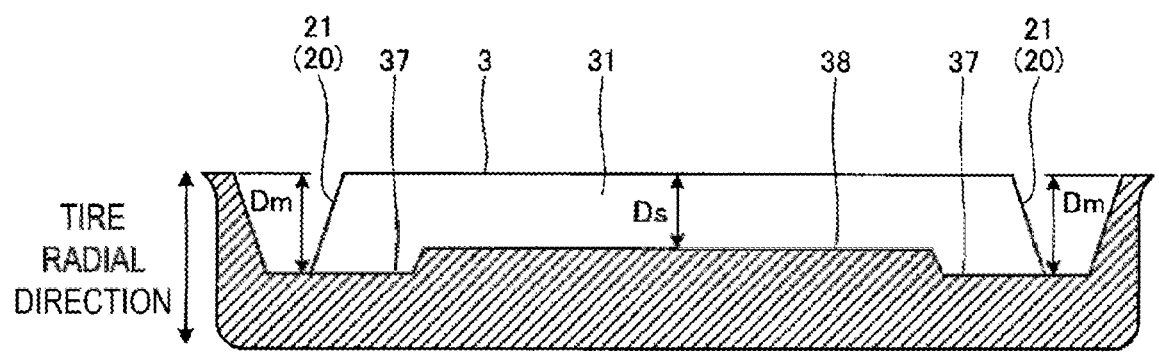
FIG. 6 is a cross-sectional view taken along C-D-D-C of FIG. 5.

Note that, while the pneumatic tire 1 according to the embodiment described above includes the center lug grooves 31 as the usual bending grooves, raised bottom portions 38 may be formed in groove bottoms 37 of the center lug grooves 31. FIG. 5 is a modified example of the pneumatic tire according to the embodiment and is an explanatory diagram in a case where the raised bottom portions are formed in the center lug grooves. FIG. 6 is a cross-sectional view taken along C-D-D-C of FIG. 5. The raised bottom portion 38 formed in the center lug groove 31 is formed by making the groove bottom 37 close to the tread surface 3 more than the other positions. That is, the raised bottom portion 38 has the groove depth shallower than the groove depths of the positions other than the raised bottom portion 38. The raised bottom portion 38 in the center lug groove 31 is formed at least in the circumferential extending portion 33 and is formed over a range of from a predetermined position in one width direction extending portions 34 to a predetermined position in the other width direction extending portion 34 among the width direction extending portions 34 at two positions in the center lug groove 31. Specifically, the raised bottom portion 38 is formed such that a width SW of the range where the raised bottom portion 38 is provided in the tire lateral direction with respect to the maximum width BW of the center block 11 in the tire lateral direction becomes in the range of 0.3≤(SW/BW)≤0.5.

In addition, the groove depth Ds at the position where the raised bottom portion 38 is formed in the center lug groove 31 with respect to a groove depth Dm of the circumferential main groove 20 is in the range of 0.6≤(Ds/Dm)≤0.9. In other words, the groove depth Ds of the center lug groove 31 at the position where the raised bottom portion 38 is formed with respect to the groove depth Dm of the inner circumferential main groove 21, which is the circumferential main groove 20 to which the center lug groove 31 is connected, is in the range of 0.6≤(Ds/Dm)≤0.9.

Note that when the groove depth at the position where the raised bottom portion 38 is formed in the center lug groove 31 changes due to a change in height of the raised bottom portion 38 depending on the position in the center lug groove 31, the average value of the groove depths at the positions where the raised bottom portion 38 is formed is defined as the groove depth Ds of the center lug groove 31 at the position where the raised bottom portion 38 is formed.

As described above, by providing the raised bottom portions 38 in the center lug grooves 31, the rigidity of the center blocks 11 can be ensured, heel-and-toe wear can be suppressed with more certainty, and uneven wear resistance can be improved.

Additionally, the width SW of the range where the raised bottom portion 38 is provided in the tire lateral direction with respect to the maximum width BW of the center block 11 in the tire lateral direction is in the range of 0.3≤(SW/BW)≤0.5, heel-and-toe wear can be suppressed with more certainty while the drainage properties by the center lug grooves 31 are ensured. In other words, with (SW/BW)<0.3, the range in which the raised bottom portion 38 is provided is excessively small. Accordingly, even when the raised bottom portions 38 are provided, the rigidity of the center blocks 11 is difficult to be effectively improved, and heel-and-toe wear is possibly difficult to be suppressed. Additionally, with (SW/BW)>0.5, the range in which the raised bottom portion 38 is provided is excessively large. This possibly facilitates blocking the flow of water flowing into the center lug grooves 31 by the raised bottom portions 38. In this case, the drainage properties by the center lug grooves 31 are deteriorated, possibly making improvement in wet performance difficult.

In contrast, with the width SW of the range in which the raised bottom portion 38 is provided with respect to the maximum width BW of the center block 11 in the range of 0.3≤(SW/BW)≤0.5, while blocking the flow of water flowing into the center lug grooves 31 by the raised bottom portions 38 is suppressed as much as possible, the raised bottom portions 38 allow the center blocks 11 to improve rigidity with more certainty. Thus, heel-and-toe wear can be suppressed with more certainty while the drainage properties by the center lug grooves 31 are ensured. As a result, wet performance and uneven wear resistance can be improved at the same time.

Additionally, the groove depth Ds of the center lug groove 31 at the position where the raised bottom portion 38 is formed with respect to the groove depth Dm of the circumferential main groove 20 is in the range of 0.6≤(Ds/Dm) ≤0.9, heel-and-toe wear can be suppressed with more certainty while the drainage properties by the center lug grooves 31 are ensured. In other words, with (Ds/Dm)<0.6, the height of the raised bottom portion 38 is excessively high. This possibly facilitates blocking the flow of the water flowing into the center lug grooves 31 by the raised bottom portions 38. In this case, the drainage properties by the center lug grooves 31 are deteriorated, possibly making improvement in wet performance difficult. In addition, with (Ds/Dm)>0.9, the height of the raised bottom portion 38 is excessively low. Accordingly, even when the raised bottom portions 38 are provided, the rigidity of the center blocks 11 is difficult to be effectively improved, and heel-and-toe wear is possibly difficult to be suppressed.

In contrast, with the groove depth Ds of the center lug groove 31 at the position of the raised bottom portion 38 with respect to the groove depth Dm of the circumferential main groove 20 in the range of 0.6≤(Ds/Dm)≤0.9, while blocking the flow of the water flowing into the center lug grooves 31 by the raised bottom portions 38 is suppressed as much as possible, the raised bottom portions 38 allow the center blocks 11 to improve rigidity with more certainty. Thus, heel-and-toe wear can be suppressed with more certainty while the drainage properties by the center lug grooves 31 are ensured. As a result, wet performance and uneven wear resistance can be improved at the same time.

Figure 7:
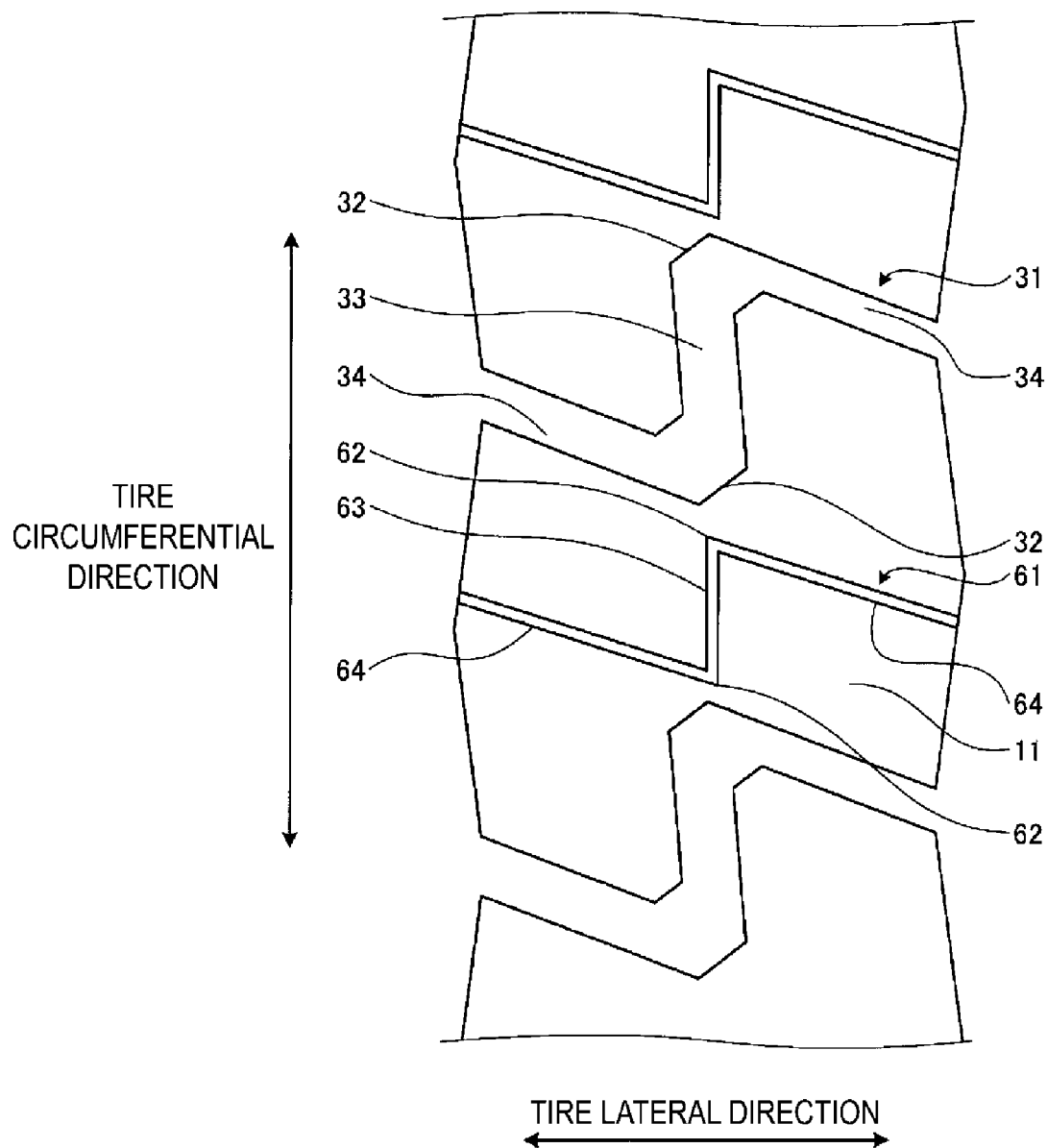
FIG. 7 is a modified example of the pneumatic tire according to the embodiment and is an explanatory diagram in a case where bent portions of the center lug grooves are formed in a chamfered shape.
Figure 8:
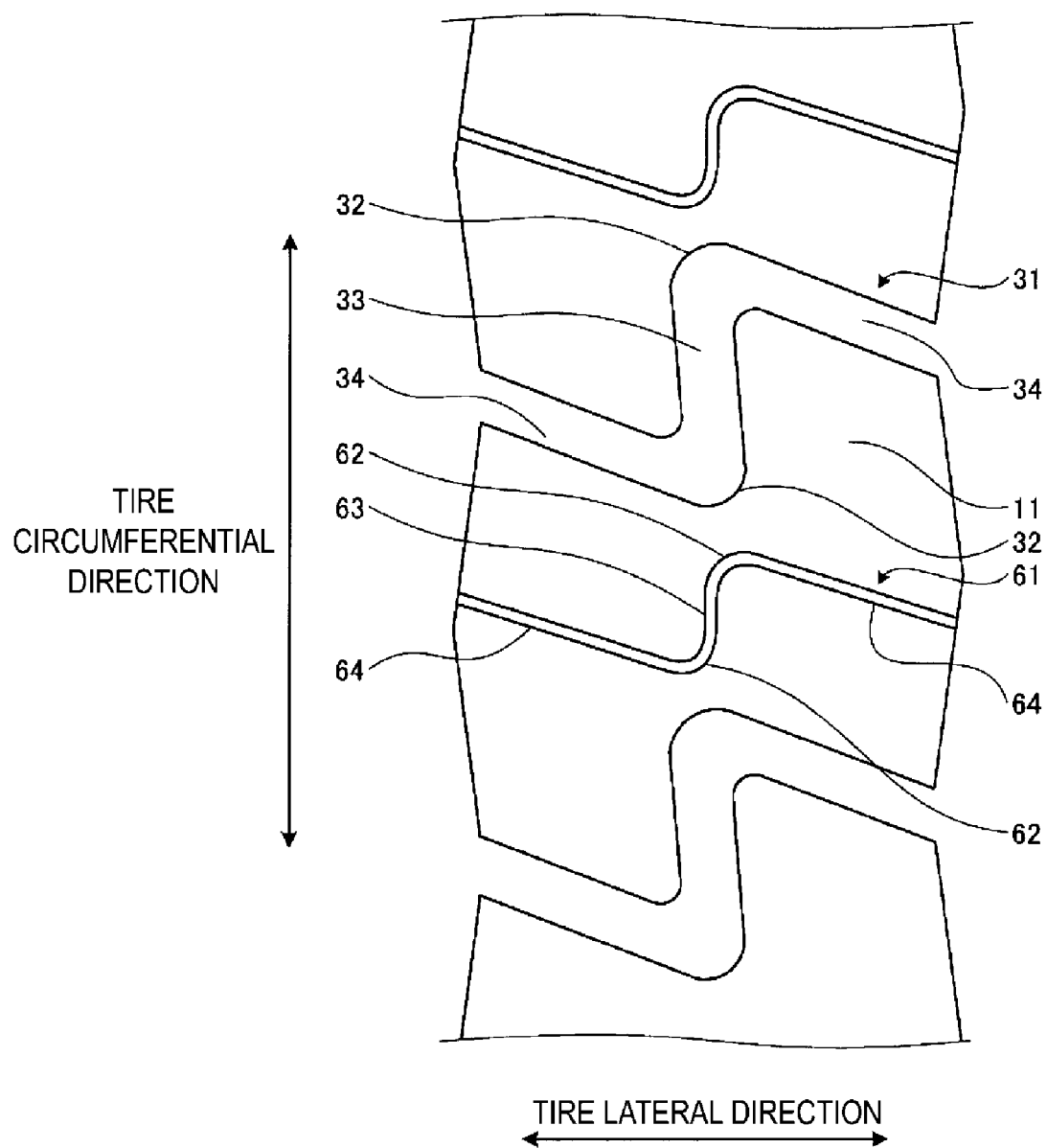
FIG. 8 is a modified example of the pneumatic tire according to the embodiment and is an explanatory diagram in a case where the bent portions of the center narrow grooves are formed into an arc shape.

While in the pneumatic tire 1 according to the embodiment described above, the bent portions 32 in the center lug grooves 31 are formed in an arc shape and the bent portions 62 in the center narrow grooves 61 are formed in an angular shape, the bent portions 32 in the center lug grooves 31 and the bent portions 62 in the center narrow groove 61 may have shapes other than those of the embodiments. FIG. 7 is a modified example of the pneumatic tire according to the embodiment and is an explanatory diagram in a case where the bent portions of the center lug grooves are formed in a chamfered shape. FIG. 8 is a modified example of the pneumatic tire according to the embodiment and is an explanatory diagram in a case where the bent portions of the center narrow grooves are formed into an arc shape. As illustrated in FIG. 7, for example, the bent portions 32 in the center lug grooves 31 may be formed in a chamfered shape or a shape in which a plurality of corner portions are combined. As illustrated in FIG. 8, for example, the bent portions 62 in the center narrow grooves 61 may be formed into a curved line shape or an arc shape. As long as the bent portions 32 in the center lug grooves 31 and the bent portions 62 in the center narrow grooves 61 are formed so that the center lug grooves 31 and the center narrow grooves 61 are bent, the bent portions 32, 62 themselves may have any shape.

Figure 9:
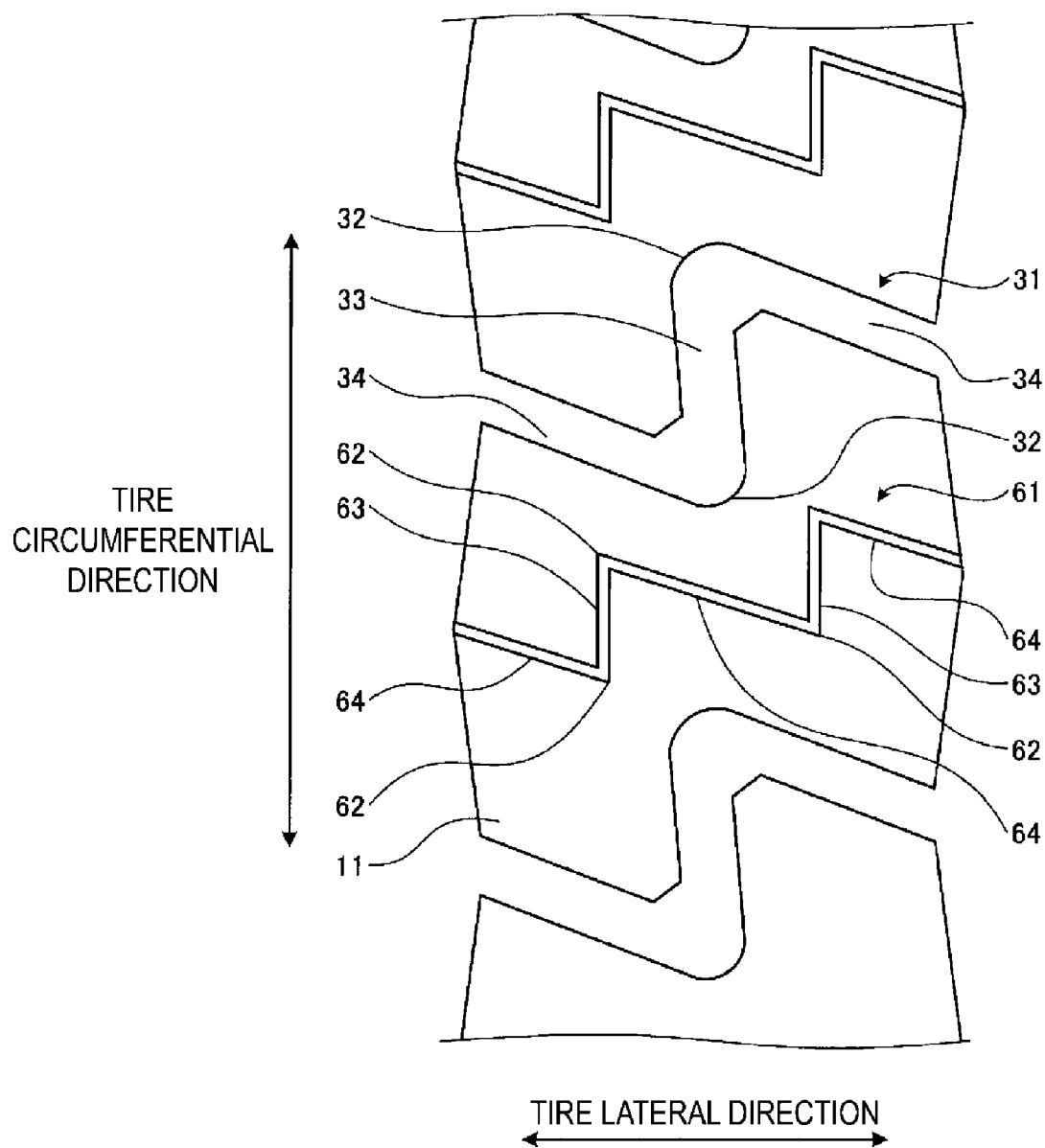
FIG. 9 is a modified example of the pneumatic tire according to the embodiment and is an explanatory diagram in a case where the bent portions of the center narrow grooves are at four positions.

Additionally, in the pneumatic tire 1 according to the embodiment described above, while the center narrow groove 61 has the bent portions 62 at two positions, the bent portions 62 in the center narrow groove 61 may be provided at two or more positions. FIG. 9 is a modified example of the pneumatic tire according to the embodiment and is an explanatory diagram in a case where the bent portions of the center narrow groove are provided at four positions. The bent portions 62 in the center narrow groove 61 may be provided at, for example, four positions as illustrated in FIG. 9. In this case, the bent portions 62 at the four positions bend in opposite directions in alternation. Thus, the center narrow groove 61 is formed into a stepped shape from one end portion to the other end portion and bent at the bent portions 62 at the four positions. Accordingly, the center narrow groove 61 has the circumferential extending portions 63 extending in the tire circumferential direction and the width direction extending portions 64 extending in the tire lateral direction, similarly to the case of the bent portions 62 provided at two positions. In other words, with the bent portions 62 at four positions, the center narrow groove 61 is formed into the following shape. The center narrow groove 61 includes three width direction extending portions 64, two width direction extending portions 64 being located on both end sides in the tire lateral direction and connected to the inner circumferential main grooves 21, one width direction extending portion 64 being located between the two width direction extending portions 64. The center narrow groove 61 is formed such that the width direction extending portions 64 adjacent in the tire lateral direction are connected with the circumferential extending portions 63 therebetween. These connection portions of the width direction extending portions 64 with the circumferential extending portions 63 become the bent portions 62.

In a case of the bent portions 62 provided at the four positions in the center narrow groove 61, it is possible to suppress the center narrow grooves 61 being excessively close to the bent center lug grooves 31. In other words, with the center lug grooves 31 and the center narrow grooves 61 both have the bent portions 32, 62, depending on the positions of both bent portions 32, 62, a portion where a distance between the center lug groove 31 and the center narrow groove 61 is excessively close is possibly present. In this case, since the rigidity of the portion where the distance between the center lug groove 31 and the center narrow groove 61 is close in the center block 11 is deteriorated, steering stability is possibly difficult to be ensured on dry road surfaces, and uneven wear is possibly likely to occur in the low rigidity portion.

In contrast, with the bent portions 62 provided at four positions in the center narrow groove 61, appropriately setting the positions of the respective bent portions 62 in accordance with the shape of the center lug grooves 31 allows the shape of the center narrow groove 61 not to generate a portion excessively close to the center lug groove 31. This allows the generation of the portion with low rigidity in the center blocks 11 to be suppressed so that the steering stability on dry road surfaces can be ensured and uneven wear can be suppressed with more certainty. As a result, dry performance can be improved, and uneven wear resistance can be improved with more certainty.

Note that, with the excessively large number of bent portions 62 of the center narrow groove 61, the rigidity of a periphery of a portion where the center narrow groove 61 is formed becomes low, thus possibly the breakage of the block is likely to occur, and a crack is likely to occur. However, configuring the lengths of the respective circumferential extending portion 63 and width direction extending portion 64 to be 8 mm or more allows the breakage of the block and the crack to be suppressed. Thus, wet performance can be improved while block breakage resistance is ensured with more certainty.

EXAMPLES

FIGS. 10A to 10E are tables depicting results of a performance test of pneumatic tires. In relation to the pneumatic tire 1 described above, performance evaluation tests conducted on the pneumatic tires 1 of Conventional Examples and Comparative Examples and the pneumatic tires 1 according to embodiments of the present technology will be described below. The performance evaluation tests were conducted on a test regarding dry accelerating performance, accelerating performance on a dried road surface, a test regarding wet accelerating performance, accelerating performance on a wet road surface, a test regarding uneven wear resistance, and a test regarding block breakage resistance.

These performance evaluation tests were conducted as follows. The pneumatic tires 1 with a tire nominal of 275/80R22.5 size and a load index of 151J specified by JATMA were mounted on rim wheels of specified rims specified by JATMA. The air pressure was adjusted to be the maximum air pressure specified by JATMA. The pneumatic tires 1 were mounted on a 2-D test vehicle (tractor head), and test running was performed.

Among respective test items, an evaluation method for the wet accelerating performance evaluated as follows. Acceleration in a speed section of from 5 to 20 km/h on the wet road surface was measured. The average acceleration is expressed as index values with Conventional Example described later being assigned the value of 100. Larger values indicate an excellent wet performance. Regarding uneven wear resistance, an amount of wear of heel-and-toe wear after 50000 km-traveling—that is, a difference in the amount of wear between a trailing and a leading of the blocks—was measured. The measured difference in the amount of wear is expressed as index values with Conventional Example described later being assigned the value of 100. Larger values indicate a small amount of wear of heel-and-toe wear and an excellent uneven wear resistance. Regarding block breakage resistance, the status of the breakage of the block and crack after 50000 km-traveling in the market testing was observed. The numbers and sizes of the breakages of blocks and cracks are expressed as index values with Conventional Example described later being assigned the value of 100. Larger values indicate a small amount of breakages of blocks and cracks and an excellent block breakage resistance.

The evaluation test was conducted on 28 types of pneumatic tires: the pneumatic tire of Conventional Example, which is an example of a conventional pneumatic tire 1, Examples 1 to 25 as the pneumatic tires 1 according to the embodiments of the present technology, and Comparative Examples 1 and 2, which are pneumatic tires compared with the pneumatic tires 1 according to the embodiments of the present technology. Among these pneumatic tires 1, the pneumatic tire of Conventional Example does not include the center narrow grooves 61, the block row of the center block 11 located between the inner circumferential main grooves 21 is one row, and the bent portions 32 are provided at two positions in the center lug groove 31. Additionally, while the pneumatic tires of Comparative Examples 1 and 2 include the center narrow grooves 61 in the center blocks 11 and the center narrow groove 61 includes the bent portions 62 at two positions, the center narrow grooves 61 terminate in the center blocks 11, or the block rows of the center blocks 11 located between the inner circumferential main grooves 21 are two rows.

In contrast, in Examples 1 to 25, which are the examples of the pneumatic tires 1 according to the embodiments of the present technology, the center narrow grooves 61 are all connected to the circumferential main grooves 20 and open to the circumferential main grooves 20, the block row of the center block 11 located between the inner circumferential main grooves 21 is one row, and the bent portions 32 of the center lug grooves 31 and the bent portions 62 of the center narrow groove 61 are each provided at two or more positions. Furthermore, the pneumatic tires 1 according to Examples 1 to 25 differ in the following: the ratio of the maximum width BW of the center block 11 to the developed tread width TW (BW/TW); the ratio of the length RL of the overlapping region 16 to the length BL of the center block 11 (RL/BL); the angle α of the bent portion 32 in the center lug groove 31; the angle β of the bent portion 62 in the center narrow groove 61; the ratio of the groove depth Dc of the circumferential extending portion 63 to the groove depth Dr of the width direction extending portion 64 of the center narrow groove 61 (Dc/Dr); the ratio of the distance NL between the connection portions of the center narrow groove 61 and the center lug groove 31 connected to the inner circumferential main groove 21 to the distance EL between the center lug grooves 31 in the tire circumferential direction (NL/EL); the ratio of the width SW of the range where the raised bottom portion 38 is provided to the maximum width BW of the center block 11 (SW/BW); and the ratio of the groove depth Ds of the center lug groove 31 at the position where the center lug groove 31 is provided to the groove depth Dm of the circumferential main groove 20 (Ds/Dm).

As depicted in FIGS. 10A to 10E, results of conducting the evaluation tests using these pneumatic tires 1 have found that the pneumatic tires 1 of Example 1 to 25 improve wet accelerating performance without deteriorating uneven wear resistance and block breakage resistance compared with those of Conventional Example and Comparative Examples 1 and 2. In other words, the pneumatic tires 1 according to Examples 1 to 25 can improve wet performance without deteriorating uneven wear resistance.

The invention claimed is:

1. A pneumatic tire comprising:
a pair of circumferential main grooves disposed on both sides of a tire equatorial plane in a tire lateral direction, the tire equatorial plane being interposed between the pair of circumferential main grooves, the pair of circumferential main grooves extending in a tire circumferential direction and oscillating in the tire lateral direction;
a plurality of center lug grooves having both ends connected to the pair of circumferential main grooves; and
center blocks defined by the center lug grooves and the pair of circumferential main grooves,
the center lug grooves having bent portions at two or more positions,
the center blocks comprising center narrow grooves having both ends connected to the pair of circumferential main grooves, the center narrow grooves having bent portions at two or more positions; wherein
the center lug grooves have the bent portions with an angle α of a minor angle in a range of from 50° or more to 90° or less,
the center blocks have a maximum width BW in the tire lateral direction with respect to a developed tread width TW in a range of 0.2≤(BW/TW)≤0.5,
the center blocks comprise overlapping regions where positions in the tire circumferential direction are same between the center blocks adjacent in the tire circumferential direction, and
the overlapping regions have a length RL in the tire circumferential direction with respect to a length BL of the center blocks in the tire circumferential direction in a range of 0.1≤(RL/BL)≤0.4.

2. The pneumatic tire according to claim 1, wherein the center narrow grooves have the bent portions with an angle β of a minor angle in a range of from 50° or more to 90° or less.

3. The pneumatic tire according to claim 1, wherein the center narrow grooves have a relationship between a groove depth Dc of circumferential extending portions extending in the tire circumferential direction and a groove depth Dr of width direction extending portions extending in the tire lateral direction in a range of 0.8≤(Dc/Dr)≤1.2.

4. The pneumatic tire according to claim 1, wherein the center narrow grooves have a distance NL between a connection portion of the center narrow groove and a connection portion of the center lug groove connected to a same circumferential main groove in the tire circumferential direction with respect to a distance EL between the center lug grooves in the tire circumferential direction in a range of 0.3≤(NL/EL)≤0.5.

5. The pneumatic tire according to claim 1, wherein
the center lug grooves comprise raised bottom portions on groove bottoms, and
the raised bottom portions have a width SW of a range where the raised bottom portion is provided in the tire lateral direction with respect to a maximum width BW of the center block in the tire lateral direction in a range of 0.3≤(SW/BW)≤0.5.

6. The pneumatic tire according to claim 5, wherein the center lug grooves have a groove depth Ds at a position where the raised bottom portion is formed with respect to a groove depth Dm of the circumferential main groove in a range of 0.6≤(Ds/Dm)≤0.9.

7. The pneumatic tire according to claim 1, wherein
the bent portions are provided in the center lug groove at two positions, and
the bent portions are provided in the center narrow groove at four positions.

8. The pneumatic tire according to claim 1, wherein the center narrow groove in a range between a connection portion to one of the circumferential main grooves and one of the bent portions is formed to be approximately parallel to the center lug groove in a range between the connection portion to the one of the circumferential main grooves and the one of the bent portions.

9. The pneumatic tire according to claim 2, wherein the center narrow grooves have a relationship between a groove depth Dc of circumferential extending portions extending in the tire circumferential direction and a groove depth Dr of width direction extending portions extending in the tire lateral direction in a range of 0.8≤(Dc/Dr)≤1.2.

10. The pneumatic tire according to claim 9, wherein the center narrow grooves have a distance NL between a connection portion of the center narrow groove and a connection portion of the center lug groove connected to the same circumferential main groove in the tire circumferential direction with respect to a distance EL between the center lug grooves in the tire circumferential direction in a range of 0.3≤(NL/EL)≤0.5.

11. The pneumatic tire according to claim 10, wherein
the center lug grooves comprise raised bottom portions on groove bottoms, and
the raised bottom portions have a width SW of a range where the raised bottom portion is provided in the tire lateral direction with respect to the maximum width BW of the center block in the tire lateral direction in a range of 0.3≤(SW/BW)≤0.5.

12. The pneumatic tire according to claim 11, wherein the center lug grooves have a groove depth Ds at a position where the raised bottom portion is formed with respect to a groove depth Dm of the circumferential main groove in a range of 0.6≤(Ds/Dm)≤0.9.

13. The pneumatic tire according to claim 12, wherein
the bent portions are provided in the center lug groove at two positions, and
the bent portions are provided in the center narrow groove at four positions.

14. The pneumatic tire according to claim 13, wherein the center narrow groove in a range between a connection portion to one of the circumferential main grooves and the one of the bent portions is formed to be approximately parallel to the center lug groove in a range between the connection portion to the one of the circumferential main grooves and the one of the bent portions.

* * * * *